United States Patent
Hoshuyama et al.

(10) Patent No.: US 11,422,248 B2
(45) Date of Patent: Aug. 23, 2022

(54) SIGNAL PROCESSING DEVICE, SIGNAL PROCESSING METHOD, AND SIGNAL PROCESSING PROGRAM

(71) Applicant: NEC Corporation, Tokyo (JP)

(72) Inventors: Osamu Hoshuyama, Tokyo (JP); Kentarou Kudou, Tokyo (JP); Shohei Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 562 days.

(21) Appl. No.: 16/466,335

(22) PCT Filed: Oct. 4, 2017

(86) PCT No.: PCT/JP2017/036104
§ 371 (c)(1),
(2) Date: Jun. 4, 2019

(87) PCT Pub. No.: WO2018/105216
PCT Pub. Date: Jun. 14, 2018

(65) Prior Publication Data
US 2020/0081111 A1 Mar. 12, 2020

(30) Foreign Application Priority Data

Dec. 8, 2016 (JP) .............................. JP2016-238243
Mar. 30, 2017 (JP) .............................. JP2017-068244

(51) Int. Cl.
*G01S 13/56* (2006.01)
*G01S 13/536* (2006.01)

(52) U.S. Cl.
CPC ............ *G01S 13/56* (2013.01); *G01S 13/536* (2013.01)

(58) Field of Classification Search
CPC .................................................. G06S 13/536
See application file for complete search history.

(56) References Cited

U.S. PATENT DOCUMENTS

| 4,389,649 A | 6/1983 | Parkhurst et al. |
| 5,212,489 A | 5/1993 | Nelson |
| 2014/0145872 A1* | 5/2014 | Shirakawa ............. G01S 7/354 342/132 |

FOREIGN PATENT DOCUMENTS

| JP | H03-156300 A | 7/1991 |
| JP | 2005-159602 A | 6/2005 |

(Continued)

OTHER PUBLICATIONS

International Search Report in International Application No. PCT/JP2017/036104, dated Dec. 26, 2017.

(Continued)

*Primary Examiner* — Thomas M Hammond, III
*Assistant Examiner* — Helena H Seraydaryan
(74) *Attorney, Agent, or Firm* — Sughrue Mion, PLLC

(57) ABSTRACT

The present invention relates to a signal processing device for accurately detecting a moving object without being influenced by the speed of the moving object. This signal processing device is provided with: at least two cross-correlation calculation units for calculating cross-correlation functions for the waveform of a reflection signal obtained through the reflection, by an object, of a transmission signal having a varying frequency and different correlation waveforms generated from the waveform of the transmission signal; a combination unit for combining the at least two cross-correlation functions from the at least two cross-correlation calculation units so as not to be separated in the frequency shift direction; and a detection unit for detecting the object on the basis of the cross-correlation function resulting from the combination.

13 Claims, 35 Drawing Sheets

(56) References Cited

FOREIGN PATENT DOCUMENTS

| JP | 2008289851 A | 12/2008 |
|---|---|---|
| JP | 2010539465 A | 12/2010 |
| JP | 2012-145332 A | 8/2012 |
| WO | 2013128878 A1 | 9/2013 |

OTHER PUBLICATIONS

Written Opinion in International Application No. PCT/JP2017/036104, dated Dec. 26, 2017.
Shinichi Itoh, Basic Theory of Radar Systems, Corona Publishing Co., Ltd., 2015, Chapter 8, Pulse Compression Technique.
Yasunari Yokota, lecture material, signal processing, Part 3, Non-stationary Signal Analysis/Cepstrum Analysis (http://www.ykt.info.gifu-u.ac.jp/sp3.pdf).
Japanese Office Action for JP Application No. 2018-554838 dated Jun. 29, 2021 with English Translation.

* cited by examiner

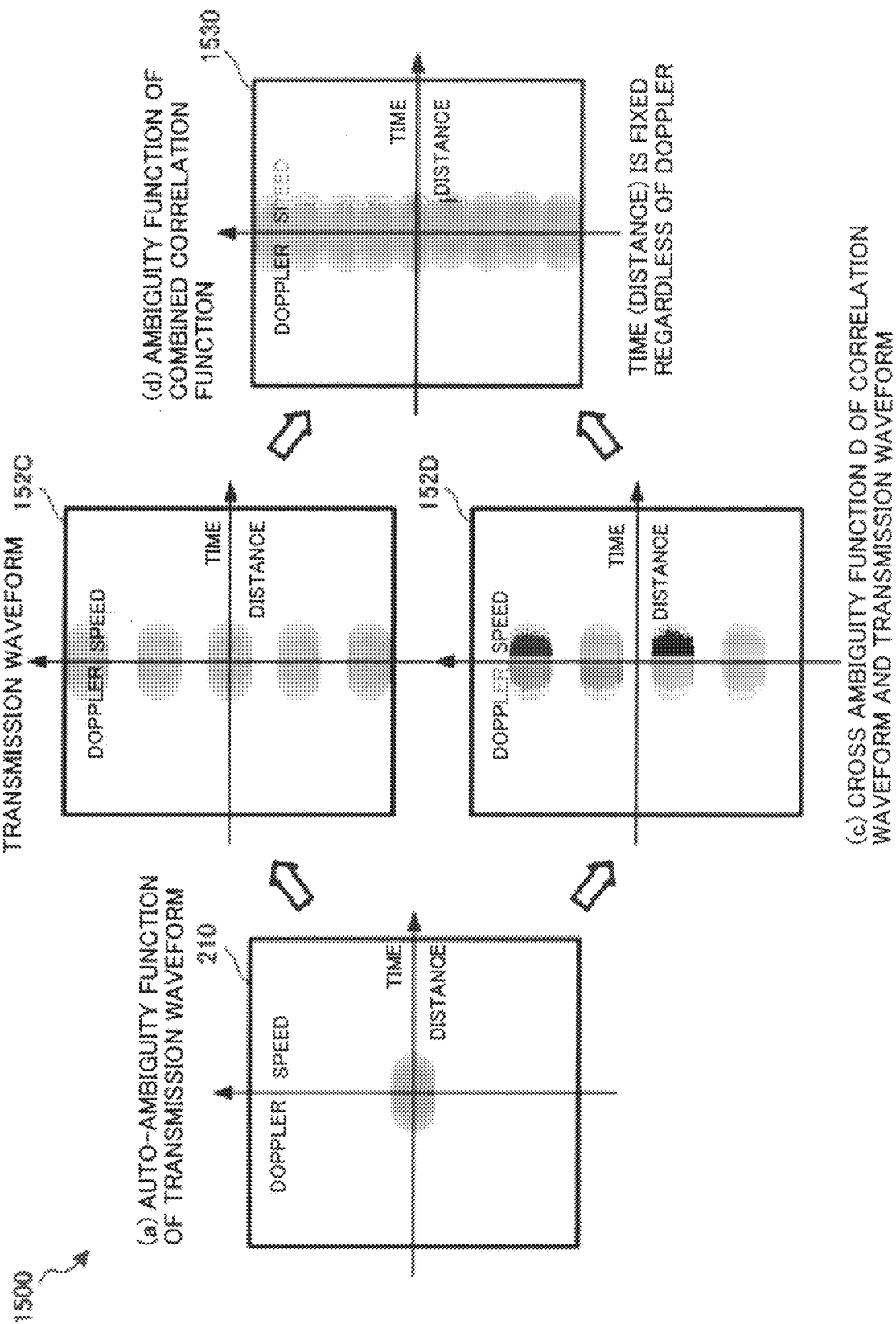

Fig. 23

| 1101 TRANSMISSION WAVEFORM | 2352 / CORRELATION WAVEFORM X 2302 | | | CORRELATION WAVEFORM X 2303 | | | | CORRELATION WAVEFORM X 2304 | | |
|---|---|---|---|---|---|---|---|---|---|---|
| | FIRST CORRECTION WAVEFORM | FOURTH CORRECTION WAVEFORM | ADDITION WAVEFORM X | SECOND CORRECTION WAVEFORM | FIFTH CORRECTION WAVEFORM | ... | ADDITION WAVEFORM Y | THIRD CORRECTION WAVEFORM | SIXTH CORRECTION WAVEFORM | ... | ADDITION WAVEFORM Z |
| BM-SFM (PERIOD a) | | | | | | | | | | |
| BM-SFM (PERIOD b) | | | | | | | | | | |
| BM-SFM (PERIOD c) | | | | | | | | | | |
| ... | | | | | | | | | | |

SIGNAL PROCESSING DEVICE, SIGNAL PROCESSING METHOD, AND SIGNAL PROCESSING PROGRAM

This application is a National Stage Entry of PCT/JP2017/036104 filed on Oct. 4, 2017, which claims priority from Japanese Patent Application 2016-238243 filed on Dec. 8, 2016 and Japanese Patent Application 2017-068244 filed on Mar. 30, 2017, the contents of all of which are incorporated herein by reference, in their entirety.

TECHNICAL FIELD

The present invention relates to a signal processing device, a signal processing method, and a signal processing program.

BACKGROUND ART

In the above-described technical field, NPL 1 discloses a technique for transmitting a radio wave, receiving a radio wave reflected by a target object, and measuring a distance by a cross-correlation function of a waveform of the received radio wave and a waveform of the transmitted radio wave, in order to measure a distance to the target object. Further, PTL 1 discloses a technique for detecting at least any of a distance to a target object and a movement speed by using, as a transmission waveform of a sound wave signal, a waveform (so-called an accelerated sinusoidal frequency modulation (ASFM) waveform) acquired by modulating a sinusoidal wave of frequency modulation of an SFM waveform.

CITATION LIST

Patent Literature

[PTL 1] International Patent Publication No. WO2013/128878

Non Patent Literature

[NPL 1] Shinichi ITOH, Basic Theory of Radar Systems, CORONA PUBLISHING CO., LTD., 2015, Chapter 8, Pulse Compression Technique
[NPL 2] Yasunari YOKOTA, lecture material, signal processing, Part 3, Non-stationary Signal Analysis/Cepstrum Analysis (http://www.ykt.info.gifu-u.ac.jp/sp3.pdf)
PTLs 1 and 2 describe that a communication method is selected, based on an adaptive modulation method according to a value of a signal to interference ratio (SIR).

SUMMARY OF INVENTION

Technical Problem

However, in the techniques described in the above-described documents, a moving object at a specific speed can be detected, but the moving object cannot be accurately detected without being affected by the speed of the moving object.

An object of the present invention is to provide a technique that solves the above-described problem.

Solution to Problem

In order to achieve the object described above, a signal processing device of the present invention includes: at least two cross-correlation calculation means each for calculating a cross-correlation function of a waveform of a reflection signal and a different correlation waveform generated from a waveform of a transmission signal, the reflection signal being acquired by reflection, from a target object, of the transmission signal that varies in frequency; combination means for combining at least two cross-correlation functions from the at least two cross-correlation calculation means, in such a way that the cross-correlation functions are not separated in a frequency shift direction; and detection means for detecting the target object, based on a cross-correlation function being a combination result.

In order to achieve the object described above, a signal processing method of the present invention includes: at least two cross-correlation calculation steps each of calculating a cross-correlation function of a waveform of a reflection signal and a different correlation waveform generated from a waveform of the transmission signal, the reflection signal being acquired by reflection, from a target object, of the transmission signal that varies in frequency; a combination step of combining at least two cross-correlation functions from the at least two cross-correlation calculation means; and a detection step of detecting the target object, based on a cross-correlation function being a combination result.

In order to achieve the object described above, a signal processing program of the present invention causes a computer to execute: at least two cross-correlation calculation steps each of calculating a cross-correlation function of a waveform of a reflection signal and a different correlation waveform generated from a waveform of the transmission signal, the reflection signal being acquired by reflection, from a target object, of a transmission signal that varies in frequency; a combination step of combining at least two cross-correlation functions from the at least two cross-correlation calculation means; and a detection step of detecting the target object, based on a cross-correlation function being a combination result.

Advantageous Effects of Invention

According to the present invention, a moving object can be accurately detected without being affected by a speed of the moving object.

BRIEF DESCRIPTION OF DRAWINGS

FIG. 15 is diagram for explaining a processing outline of a signal processing device according to a fourth example embodiment of the present invention.

FIG. 23 is a diagram illustrating a configuration of a correlation waveform generation table according to the sixth example embodiment of the present invention.

EXAMPLE EMBODIMENT

Hereinafter, example embodiments of the present invention are exemplarily described in detail with reference to the drawings. However, a component described in the example embodiments below is merely an exemplification, and a technical scope of the present invention is not intended to be limited to only the component. Hereinafter, a waveform in cross-correlation with a reception waveform for detecting a target object is referred to as a correlation waveform.

First Example Embodiment

Figure 1:
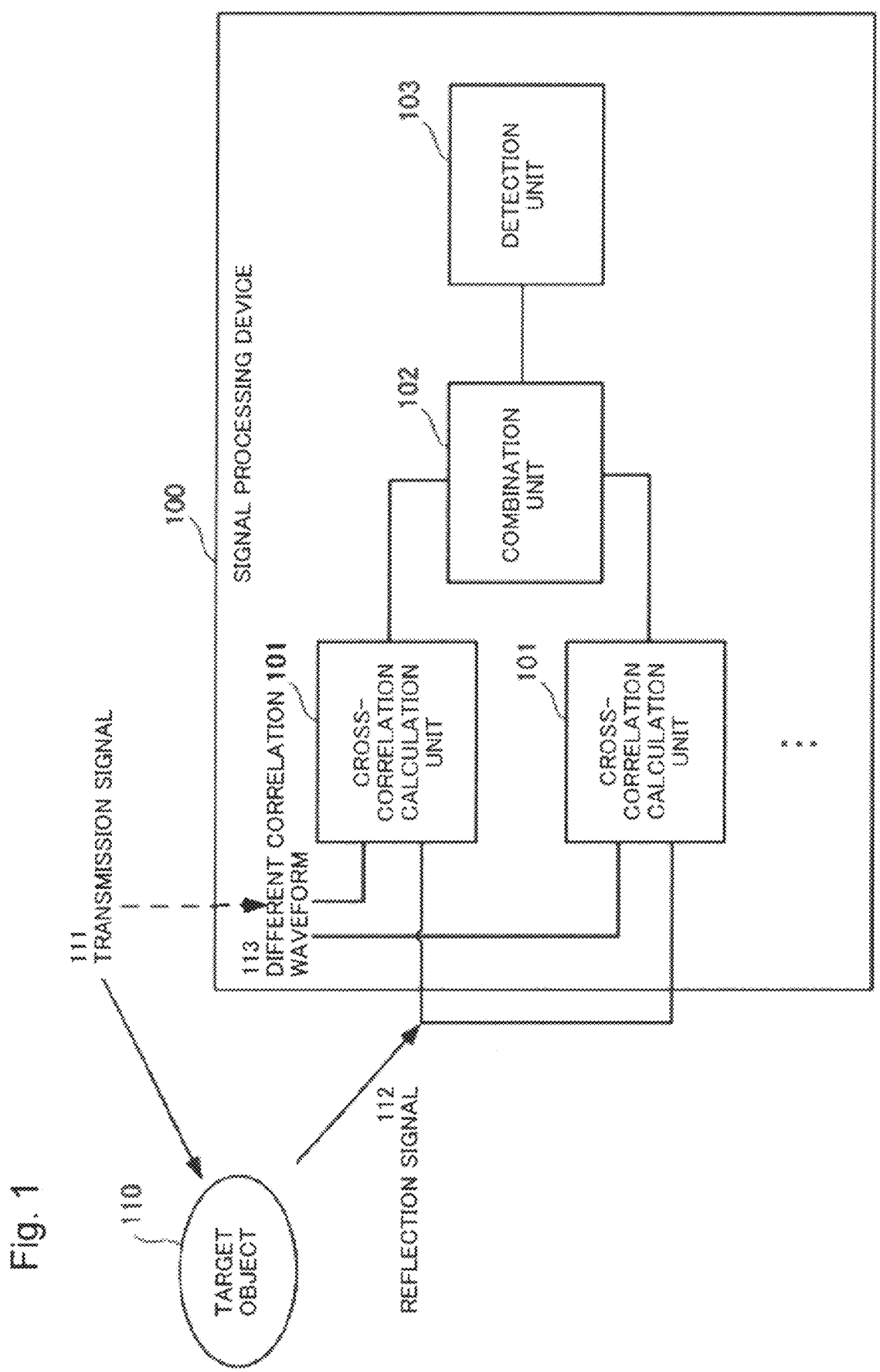
FIG. 1 is a block diagram illustrating a configuration of a signal processing device according to a first example embodiment of the present invention.

A signal processing device 100 as a first example embodiment of the present invention is described by using FIG. 1. The signal processing device 100 is a device that detects a moving object by a reflection signal.

As illustrated in FIG. 1, the signal processing device 100 includes at least two cross-correlation calculation units 101, a combination unit 102, and a detection unit 103. The at least two cross-correlation calculation units 101 each calculate a cross-correlation function of a waveform of a reflection signal 112 acquired by reflection of a transmission signal 111 reflected by a target object 110, the transmission signal 111 varying in frequency, and a different correlation waveform 113 generated from a waveform of the transmission signal 111. The combination unit 102 combines at least two cross-correlation functions from the at least two cross-correlation calculation units 101 in such a way that the cross-correlation functions are not separated in a frequency shift direction. The detection unit 103 detects the target object 110, based on a cross-correlation function being a combination result.

According to the present example embodiment, by calculating each cross-correlation function of a reflection signal waveform and a different correlation waveform generated from a transmission signal, and combining at least two cross-correlation functions, a moving object can be accurately detected without being affected by a speed of the moving object. Furthermore, a moving object can be detected while a computation amount is reduced.

Second Example Embodiment

Next, a signal processing device according to a second example embodiment of the present invention is described. The signal processing device according to the present embodiment uses, as a different correlation waveform, a waveform added with a waveform acquired by performing different frequency correction on a transmission waveform, or a waveform added with a waveform acquired by performing expansion and contraction varying with time axis on a transmission waveform. That is a waveform in which a cross ambiguity function of a transmission waveform and a waveform on which frequency correction is performed is separated, and a cross ambiguity function, when being combined, is also continuous. Herein, the cross ambiguity function is continuous in such a way that cross-correlation functions based on the different correlation waveform overlap each other at half of a maximum value. Further, an absolute value of each of at least two cross-correlation functions is added in a configuration of the at least two cross-correlation functions. Note that the transmission signal used in the present example embodiment is a waveform having a value of an auto-ambiguity function being increased around zero delay time and zero frequency shift, and includes a waveform that is acquired by modulating a speed of frequency change in a sinusoidal frequency modulation (SFM) waveform or acquired by modulating a bandwidth of frequency modulation of an SFM waveform. In this specification, an ASFM is used as the former, and a BM-SFM is used as the latter. Note that the ASFM is also referred to as a generalized SFM (GSFM).

<<Prerequisite Technique>>

A prerequisite technique of a signal processing device is described before the signal processing device of the present embodiment is described.

In NPL 1, a waveform called linear frequency modulation (LFM) is used as a transmission waveform. FIG. 3B is a block diagram illustrating a configuration example of the signal processing device according to the prerequisite technique.

As illustrated in FIG. 3B, a signal processing device 350 includes a transmission waveform generation unit 351 and a correlation calculation unit 354. The transmission waveform generation unit 351 generates a transmission waveform and transmits the transmission waveform to a wireless transmission unit 352, and also transmits the transmission waveform to the correlation calculation unit 354. The wireless transmission unit 352 converts the transmission waveform, with performing frequency conversion and the like, to a wireless signal, and transmits the wireless signal from a transmission antenna 356. A wireless reception unit 353 receives a reflection signal 332 acquired by reflection of a transmission signal 331 reflected by a target object 330 via a reception antenna 357, performs frequency conversion and the like on the received wireless signal, and transmits the wireless signal as a reception waveform in a desired frequency band to the correlation calculation unit 354. The correlation calculation unit 354 calculates a cross-correlation function of the transmission waveform and the reception waveform, and transmits the cross-correlation function to an absolute value 355. A presence of the target object 330 and a distance to the target object 330 are detected from the cross-correlation function output from the absolute value 355.

(With Regard to Ambiguity Function)

A capability of detecting a distance is checked by using a function referred to as an ambiguity function. The ambiguity function is defined by an equation 1 as described in NPL 2.

[Equation 1]

$$A(\tau, v) = \int_{-\infty}^{\infty} U\left(t + \frac{\tau}{2}\right) U*\left(t - \frac{\tau}{2}\right) e^{iv t} dt \qquad \text{Formula 1}$$

Herein, $A(\tau,v)$ represents an ambiguity function, $\tau$ represents a time difference, $v$ represents a frequency shift amount (Doppler effect), and $U(t)$ represents a waveform for a time t. *, e, i, and $\pi$ respectively represent a complex conjugate, a base of a natural logarithm, an imaginary unit, and a ratio of a circumference.

The ambiguity function by the equation 1 is also referred to as an auto-ambiguity function. A cross ambiguity function in an equation 2 is acquired by generalizing the auto-ambiguity function to satisfy a relationship between two functions.

[Equation 2]

$$A(\tau, v) = \int_{-\infty}^{\infty} U_1\left(t + \frac{\tau}{2}\right) U_2*\left(t - \frac{\tau}{2}\right) e^{iv t} dt \qquad \text{Formula 2}$$

Herein, $U1(t)$ and $U2(t)$ are waveforms in cross-correlation. When $U1(t)$ and $U2(t)$ are the same, it is an auto-ambiguity function. The ambiguity function includes an axis of time and an axis of a frequency shift amount (doppler).

Note that, in the present example embodiment, a capability of detecting a distance, when the LFM is used for a transmission waveform and a correlation waveform, is described by using an ambiguity function thereof.

(Cross Ambiguity Function by LFM)

A spectrogram of the LFM includes an axis of time and an axis of frequency, and expresses a waveform as a time change in a sinusoidal frequency. In this LFM, a frequency is linearly changed in a range of a modulation bandwidth. When a transmission waveform is used as a correlation waveform, a cross ambiguity function thereof is the same as an auto-ambiguity function and becomes linear. Herein, when doppler in a vertical axis is converted to a movement speed of a reflection object and expressed, an axis of doppler=zero (m/s) may be checked, for example, if it is clear that the reflection object does not move. The cross ambiguity function is increased only in a close vicinity of time delay Time=0, and a time, namely, a distance to the reflection object is accurately seen. However, when a speed of the reflection object is not clear, places having a great value of the cross ambiguity function are countlessly present linearly, and a combination of doppler and time becomes indeterminate. Therefore, when doppler=0 is assumed, an error occurs in time.

(Cross Ambiguity Function by ASFM)

A spectrogram of a transmission waveform (hereinafter, an ASFM waveform) disclosed in PTL 1 and an auto-ambiguity function (cross ambiguity function when a transmission waveform itself is used as a correlation waveform) thereof are respectively illustrated in FIGS. 24 and 25.

Figure 24:
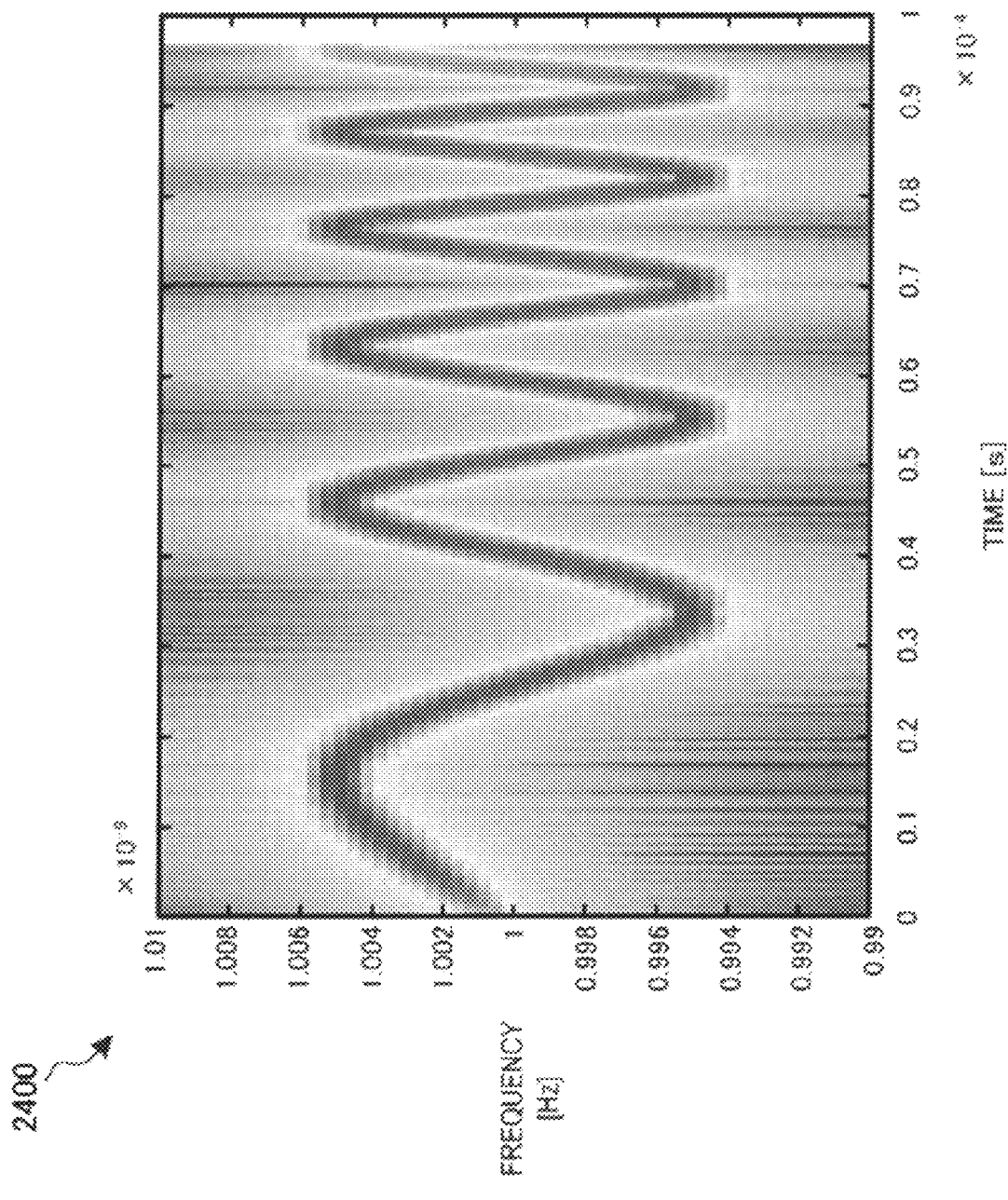
FIG. 24 is a diagram illustrating a spectrogram of a transmission waveform according to a seventh example embodiment of the present invention.

As illustrated in FIG. 24, a frequency is sinusoidally changed within a range of a modulation bandwidth, and a sinusoidal frequency thereof is also changed in the ASFM waveform. By this complicated modulation, an auto-ambiguity function has an island-shaped small region having a great value only at the center as in FIG. 25. Hereinafter, a small region having a great value of such an ambiguity function is expressed as an "island". When doppler is zero, time is acquired from this auto-ambiguity function with a high precision, but when doppler is greatly deviated from zero, a value of a cross-correlation function is not increased, that is, presence or absence of an object cannot also be detected.

Present Example Embodiment

Figure 25:
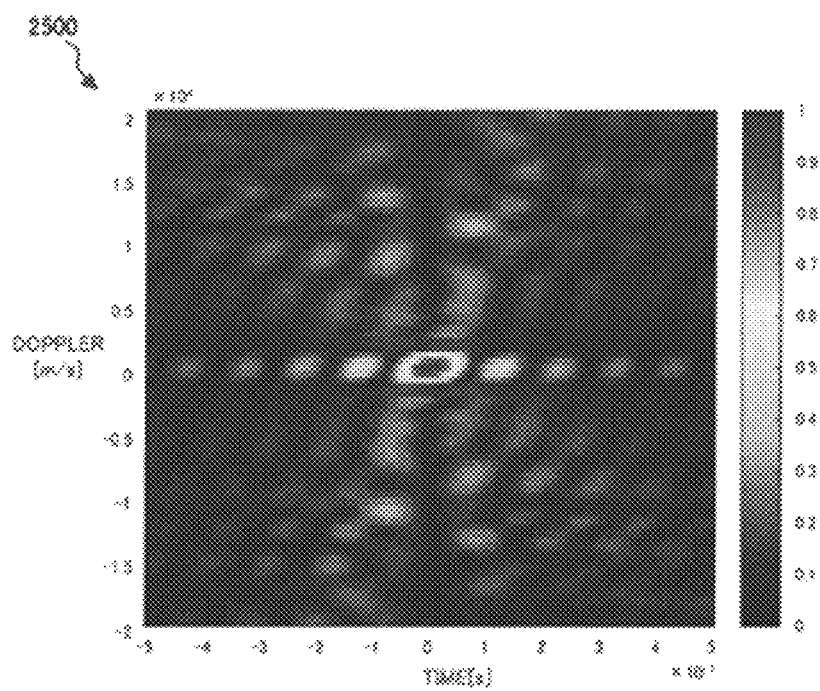
FIG. 25 is a diagram illustrating an auto-ambiguity function according to the seventh example embodiment of the present invention.

Using a waveform in consideration of doppler as a correlation waveform is conceivable in order to perform detection when doppler is great in the waveform having the auto-ambiguity function as in FIG. 25 described above. A waveform acquired by performing frequency correction on a transmission waveform or a waveform acquired by expanding and contracting a time axis of a transmission waveform is used as the waveform in consideration of doppler. However, a correlation processing unit in the same number as that of a correlation waveform is needed, and a computation amount is unnecessarily increased when a speed of a reflection object is not needed. Further, when a waveform acquired by cumulatively adding a correlation waveform is used, a target object cannot be accurately detected due to interference occurring in a cross-correlation function between correlation waveforms.

In the present example embodiment, two kinds of waveforms acquired by accumulating a waveform acquired by expanding and contracting a transmission waveform are used as a correlation waveform in correlation with a reception waveform, and respective cross-correlation functions are combined. Thus, a moving object can be accurately detected without being affected by a speed of the moving object, a computation amount can be reduced, and interference in calculation of the cross-correlation functions can also be suppressed.

<<Processing Outline of Signal Processing Device>>

Figure 2:
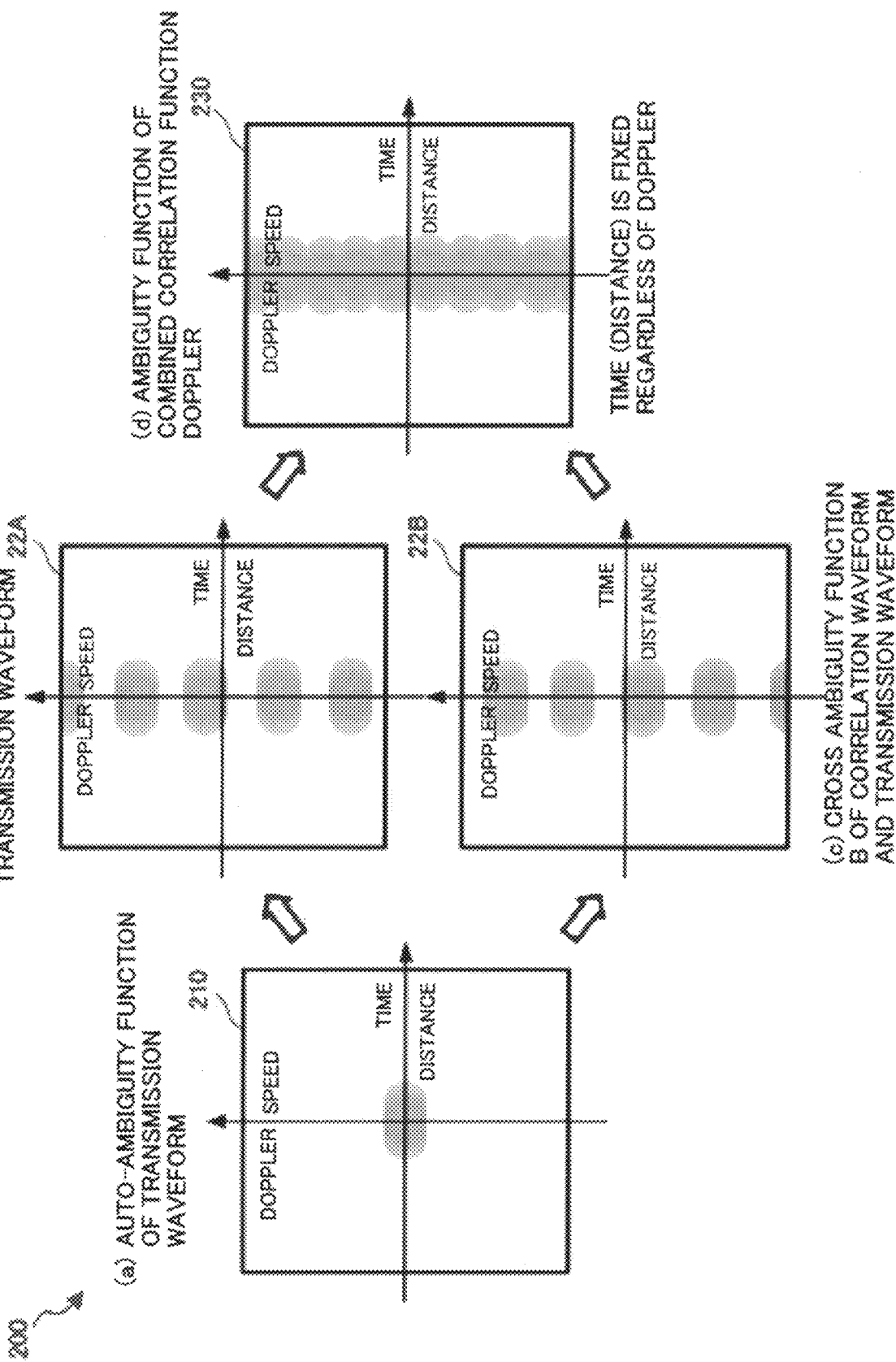
FIG. 2 is diagram for explaining a processing outline of a signal processing device according to a second example embodiment of the present invention.

FIG. 2 is a diagram for explaining a processing outline 200 of the signal processing device according to the present example embodiment. In FIG. 2, a relationship between a transmission waveform and two correlation waveforms is described with an ambiguity function being schematically illustrated.

Figure 6:
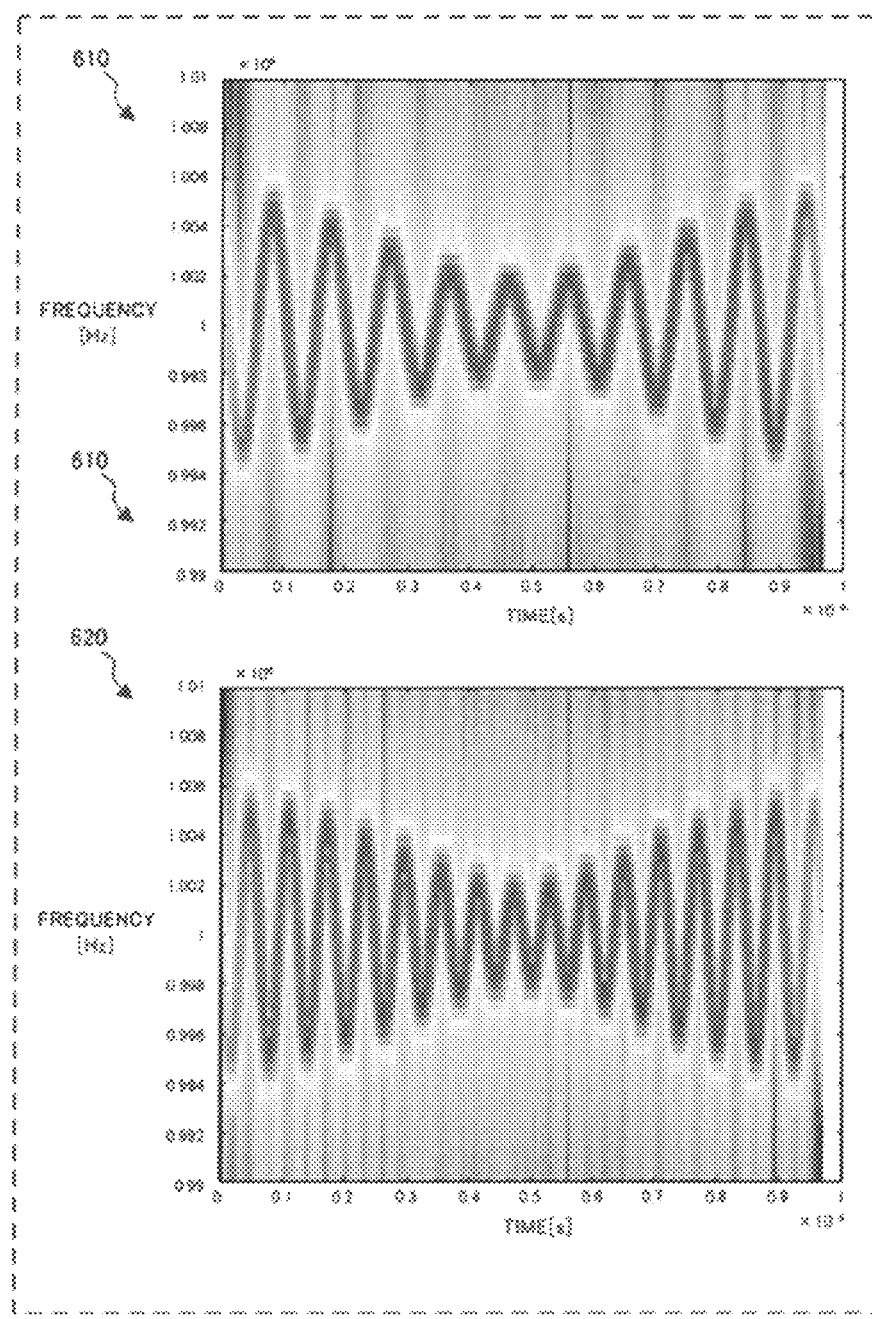
FIG. 6 is a diagram illustrating spectrograms of a transmission waveform according to the second example embodiment of the present invention.

As illustrated in a left diagram (a) in FIG. 2, a waveform in which a region having a great value of an auto-ambiguity function 210 forms an island concentrated at doppler=0 and time=0 is used as the transmission waveform. For example, a waveform illustrated in FIG. 6 is applicable.

The auto-ambiguity function is a cross ambiguity function when the transmission waveform is used as the correlation waveform. On the other hand, when a waveform on which frequency correction is performed by applying a Doppler effect to the transmission waveform is used as the correlation waveform, an island is formed at a place shifted by the applied Doppler effect. In generation of the correlation waveform, a correlation waveform is generated in such a way that a plurality of islands formed at the shifted places appear. When a correction waveform is generated, correction waveforms with an insufficient distance of Doppler shift therebetween interfere with each other, and islands are not aligned. Then, by appropriately designing an amount of frequency correction, a cross ambiguity function in which isolated islands are aligned is acquired as illustrated in central diagrams (b) and (c) in FIG. 2.

In the present example embodiment, two correlation waveforms are generated, the two correlation waveforms deriving a cross ambiguity function in which isolated islands are aligned in positions varying in amount of doppler shift alternately. Cross ambiguity functions 22A and 22B of the two correlation waveforms and a reception waveform are the two diagrams (b) and (c) at the center of FIG. 2. When an amount of frequency correction is appropriately designed, islands can be formed at places that complement each other as in the central diagrams (b) and (c) in FIG. 2.

Processing and an effect of combination in the present example embodiment are described by using a right diagram (d) in FIG. 2. In the combination processing in the present example embodiment, an absolute value of each of two cross-correlation functions calculated from the reception waveform and the two correlation waveforms is taken and added. Since the cross-correlation functions are complex numbers, the cross-correlation functions interfere with each other when being added together as they are. However, the problem of interference can be reduced by adding an absolute value. As a result, as illustrated in the right diagram (d) in FIG. 2, an ambiguity function 230 is acquired in such a way that the central diagrams (b) and (c) in FIG. 2 are simply added together. This ambiguity function 230 in the right diagram (d) in FIG. 2 is almost straight vertically, and it is clear that the ambiguity function 230 is less likely to be affected by the vertical axis, namely, the Doppler effect. This represents that a time, namely, a distance in the horizontal axis can be properly detected even with the Doppler effect.

<<Functional Configuration of Signal Processing Device>>

Figure 3A:
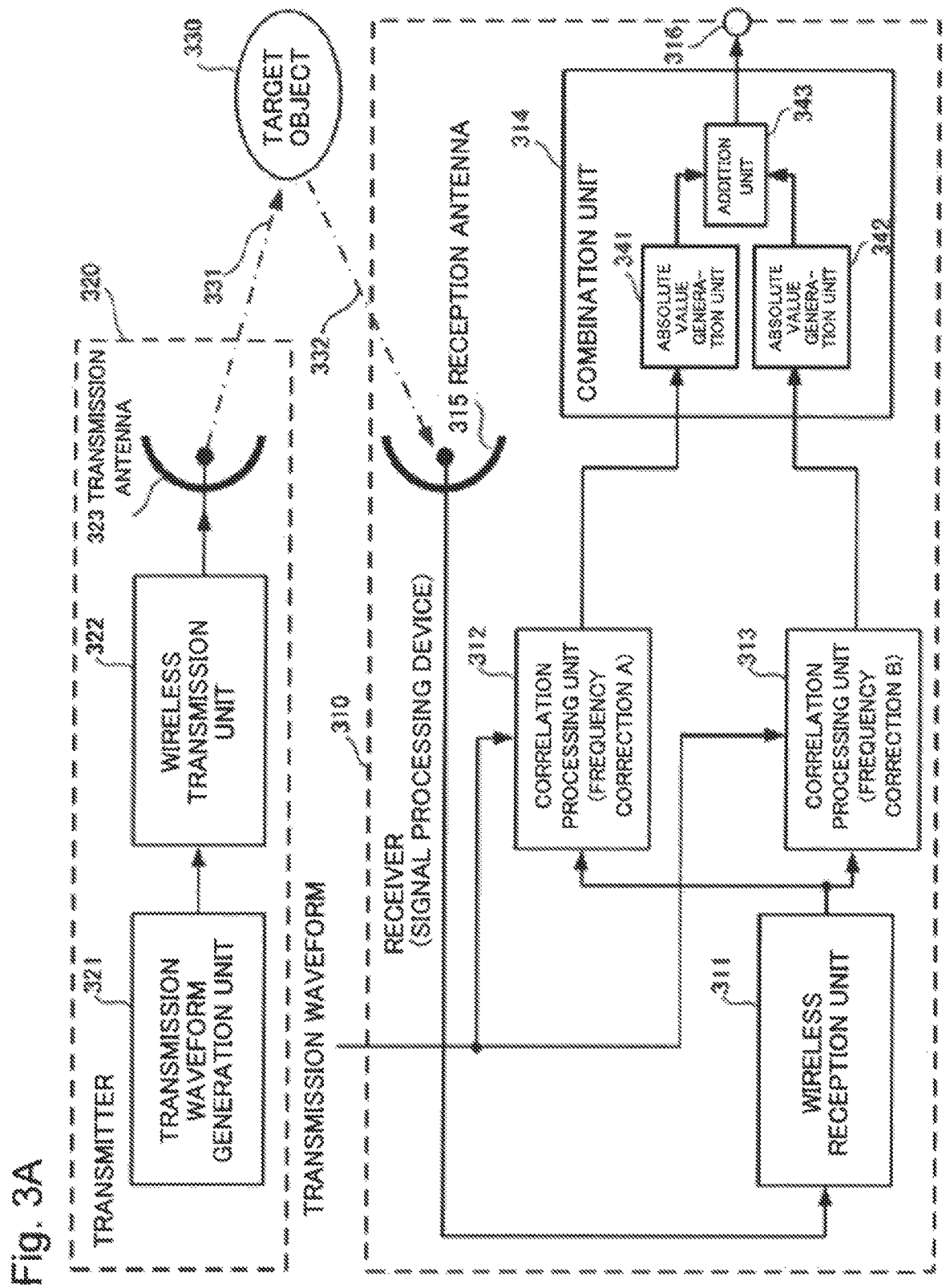
FIG. 3A is a block diagram illustrating a functional configuration of the signal processing device according to the second example embodiment of the present invention.
Figure 3B:
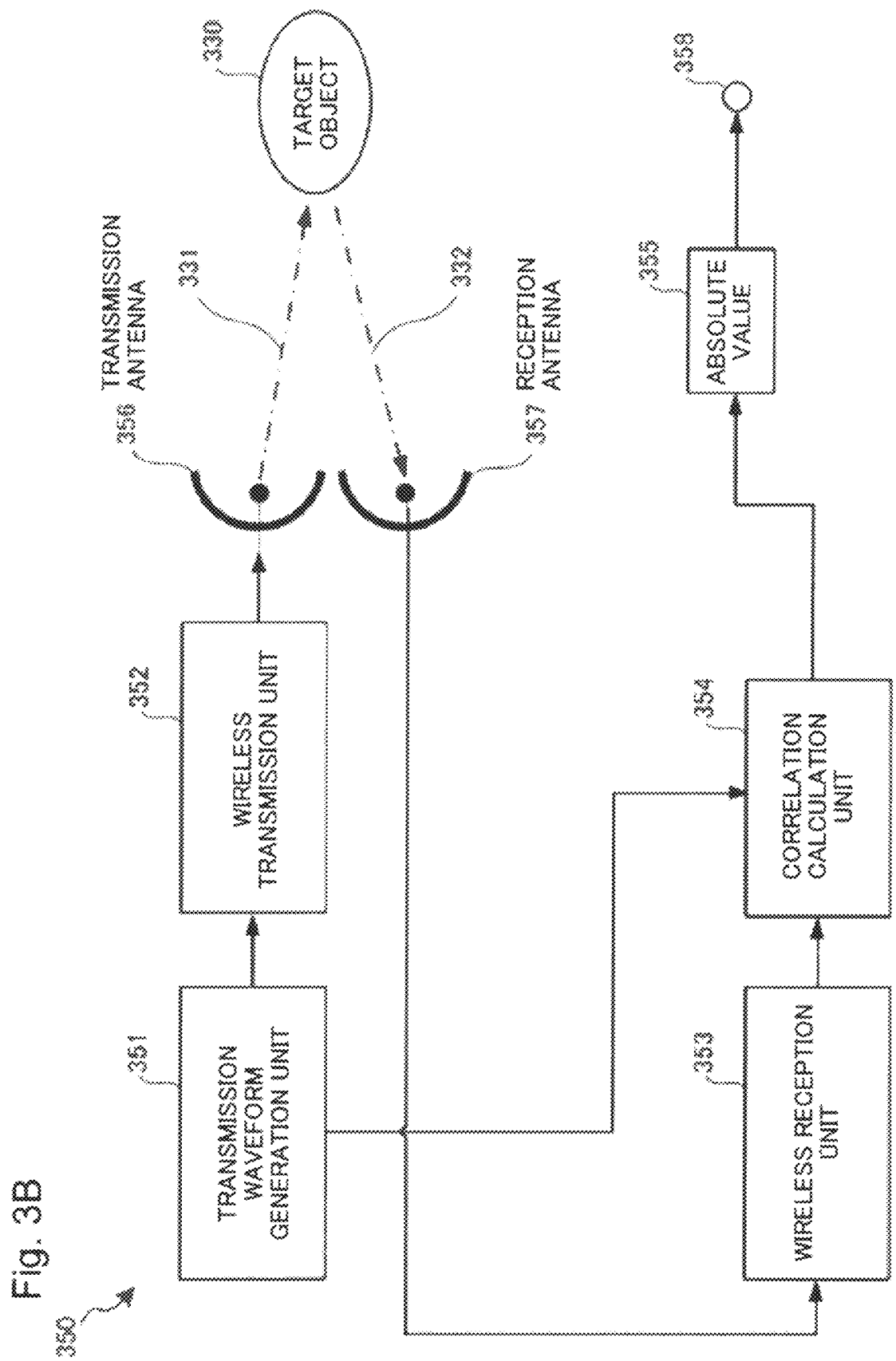
FIG. 3B is a block diagram illustrating a configuration of a signal processing device according to a prerequisite technique.

FIG. 3A is a block diagram illustrating a functional configuration of a signal processing device 310 according to the present example embodiment. In FIG. 3A, the signal processing device 310 according to the present example embodiment is illustrated as a receiver. Note that the signal processing device 310 according to the present example embodiment may be configured to include a transmitter 320.

The transmitter 320 includes a transmission waveform generation unit 321, a wireless transmission unit 322, and a transmission antenna 323. The transmission waveform generation unit 321 generates a transmission waveform, and transmits the transmission waveform to the wireless transmission unit 322. The wireless transmission unit 352 converts the transmission waveform, with performing frequency conversion and the like, to a wireless signal, and transmits the wireless signal as a transmission signal 331 from the transmission antenna 323 toward a target object 330.

The signal processing device 310 includes a wireless reception unit 311, a correlation processing unit 312, a correlation processing unit 313, a combination unit 314, and a reception antenna 315. The wireless reception unit 311 receives a reflection signal 332 from the target object 330 via the reception antenna 315, performs frequency conversion and the like on the received wireless signal, and transmits the wireless signal as a reception waveform in a desired frequency band to the correlation processing units 312 and 313. The correlation processing units 312 and 313 generate correlation waveforms different from each other, based on the transmission waveform or information about the transmission waveform, calculate cross-correlation functions of the reception waveform and respective correlation waveforms, and transmit the cross-correlation functions to the combination unit 314. The respective correlation waveforms are generated from the transmission waveform, and sampling and the like are synchronized. The combination unit 314 includes absolute value generation units 341 and 342 and an addition unit 343, receives the cross-correlation functions from the correlation processing units 312 and 313, takes respective absolute values, and outputs a combined cross-correlation function from an output unit 316.

Note that detection of the target object is not illustrated in FIG. 3A, but a position and a movement speed of the target object are detected from an output of the cross-correlation function from the output unit 316 without being affected by the movement speed.

(Correlation Processing Unit)

Figure 4:
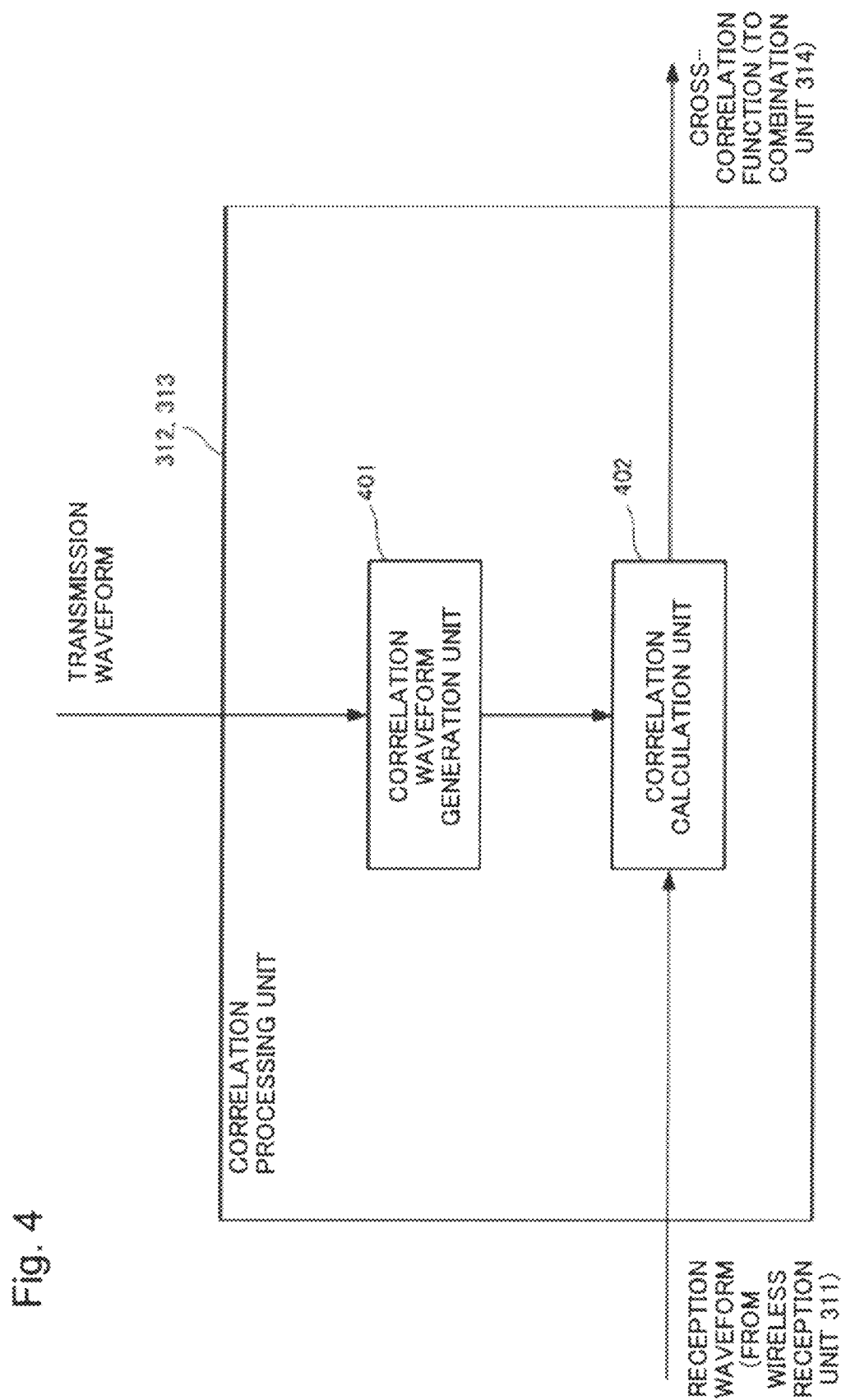
FIG. 4 is a block diagram illustrating a functional configuration of a correlation processing unit according to the second example embodiment of the present invention.

FIG. 4 is a block diagram illustrating a functional configuration of the correlation processing units 312 and 313 according to the present example embodiment.

The correlation processing units 312 and 313 include a correlation waveform generation unit 401 and a correlation calculation unit 402. The correlation waveform generation unit 401 receives a transmission waveform or information about the transmission waveform, and generates, as a correlation waveform, a waveform added with two or more waveforms acquired by performing expansion and contraction to a certain degree on the transmission waveform. The correlation calculation unit 402 calculates a cross-correlation between a reception waveform and the correlation waveform. The correlation processing units 312 and 313 have the same configuration, but vary in correlation waveform generated by the correlation waveform generation unit 401.

(Correlation Waveform Generation Unit)

Figure 5:
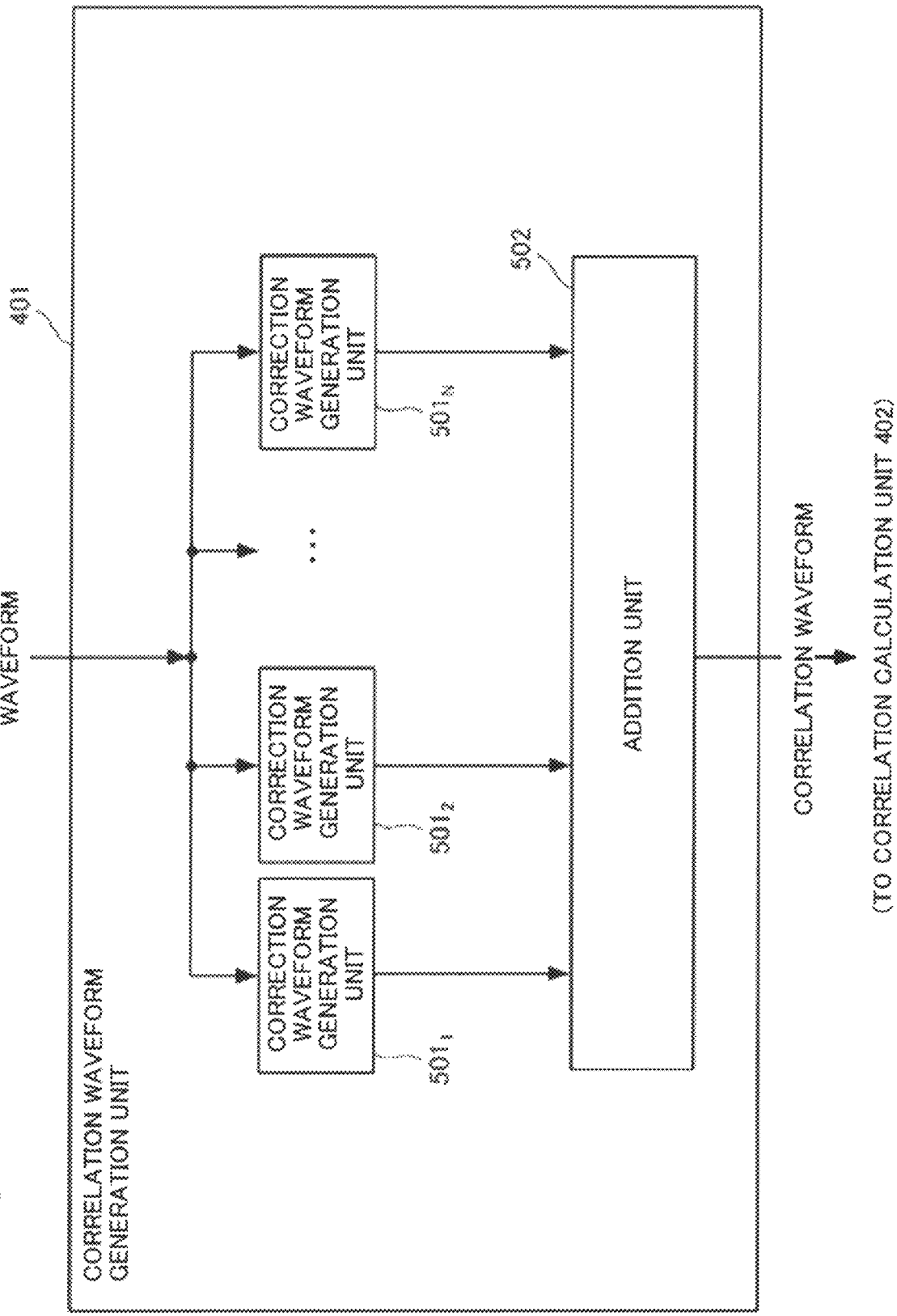
FIG. 5 is a block diagram illustrating a functional configuration of a correlation waveform generation unit according to the second example embodiment of the present invention.

FIG. 5 is a block diagram illustrating a functional configuration of the correlation waveform generation unit 401 according to the present example embodiment.

The correlation waveform generation unit 401 includes a correction waveform generation unit 501$n$ (n=1, 2, ... N) and an addition unit 502. A transmission waveform or transmission waveform information is distributed to the correction waveform generation unit 501$n$ (n=1, 2, ... N). The correction waveform generation unit 501$n$ generates a waveform on which frequency correction is performed, which is equivalent to application of a Doppler effect to the transmission waveform, and transmits the generated waveform to the addition unit 502. The addition unit 502 outputs, as a correlation waveform, a waveform to which the waveform received from the correction waveform generation unit 501$n$ (n=1, 2, ... N) is added. For generation of the waveform on which frequency correction is performed, which is equivalent to application of a Doppler effect in the correction waveform generation unit 501, generation of a waveform acquired by shifting a frequency of the transmission waveform or generation of a waveform acquired by expanding and contracting the transmission waveform in a time direction may be performed.

<<Spectrogram and Ambiguity Function>>

Hereinafter, an example of observation display of a feature in each unit of the present example embodiment is illustrated in FIGS. 6 to 9. Note that an ambiguity function is a complex number, but an absolute value thereof is illustrated by density for making it easy to see the drawings.

(Spectrogram of Transmission Waveform)

FIG. 6 is a diagram illustrating spectrograms 610 and 620 of a transmission waveform according to the present example embodiment. The transmission waveform in the present example embodiment is a bandwidth modulator-sinusoidal frequency modulation (BM-SFM) waveform being newly developed as a particularly excellent waveform. The BM-SFM is a waveform having a frequency bandwidth being modulated, and is a waveform having a frequency being increased and decreased in a curved manner and having a frequency bandwidth being increased and decreased in a curved manner in terms of time.

FIG. 6 illustrates the spectrograms 610 and 620 of BM-SFM waveform examples of two kinds. It is clear from FIG. 6 that this waveform is a FM modulated wave (SFM) having a frequency vibrating sinusoidally, and modulation is further performed on this waveform in such a way that a bandwidth of FM modulation of the SFM is increased and decreased. A difference between the waveform examples is a difference in the number (period) of vibrations in a sinusoidal shape of the SFM. While a waveform of the spectrogram 610 vibrates for 10.5 times during one millisecond, a waveform of the spectrogram 620 vibrates for 15.5 times.

(Auto-Ambiguity Function)

Figure 7:
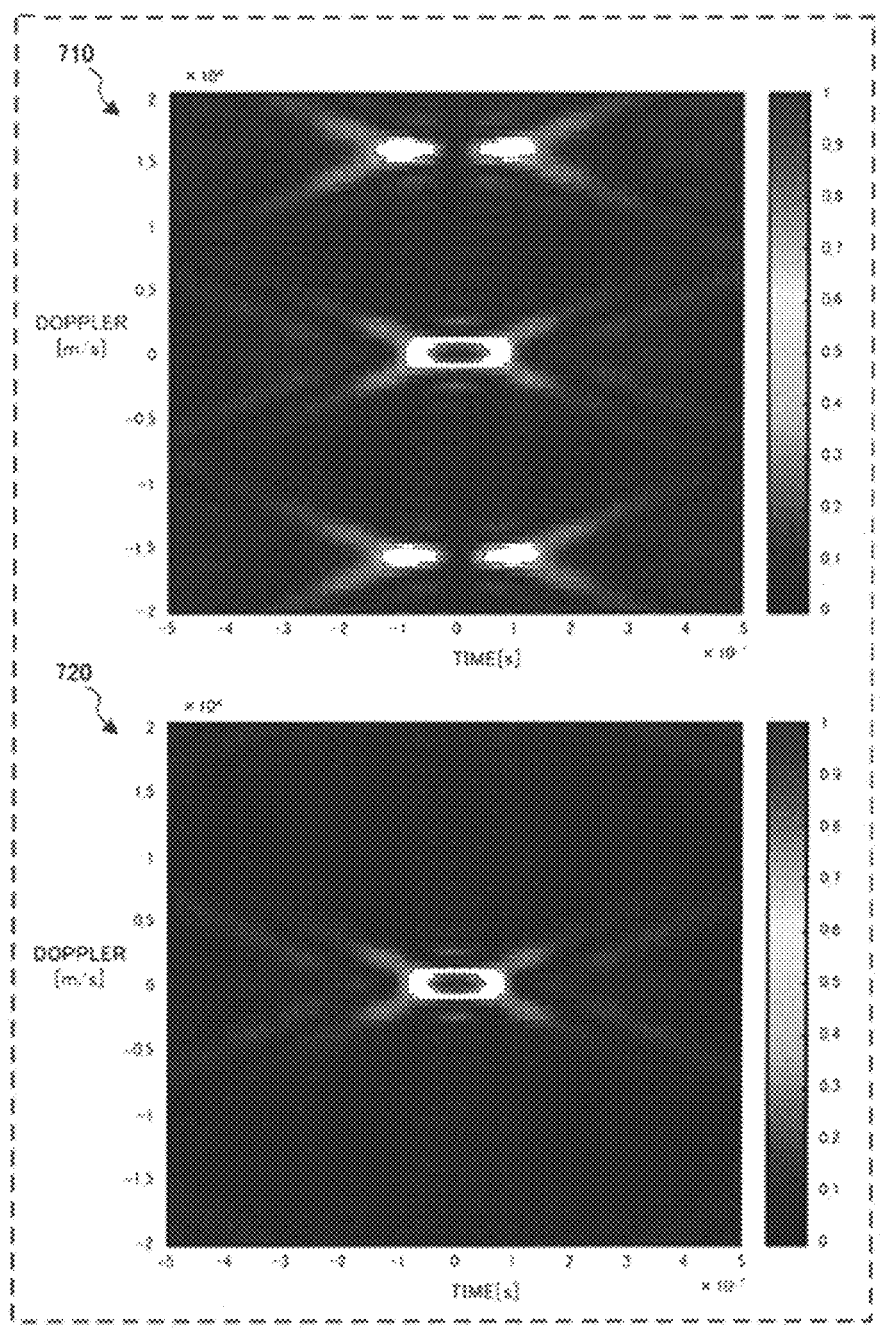
FIG. 7 is a diagram illustrating auto-ambiguity functions according to the second example embodiment of the present invention.

FIG. 7 is a diagram illustrating auto-ambiguity functions 710 and 720 according to the present example embodiment.

Note that a maximum value of a Doppler shift in FIG. 7 corresponds to a speed of an artificial satellite and a rocket.

The auto-ambiguity function 710 is an auto-ambiguity function of the BM-SFM waveform example of the spectrogram 610. The auto-ambiguity function 720 is an auto-ambiguity function of the BM-SFM waveform example of the spectrogram 620. It is clear from FIG. 7 that the auto-ambiguity functions of these waveforms have an island formed near the center by complicated modulation. Islands are isolated from each other in the auto-ambiguity function 710, but only an artificial satellite and a rocket are an object at such a speed, and thus it is not practically inconvenient. By further increasing the number of vibrations, isolated islands can be further located away from each other and be substantially unseen as in the auto-ambiguity function 720.

(Cross Ambiguity Function)

Figure 8:
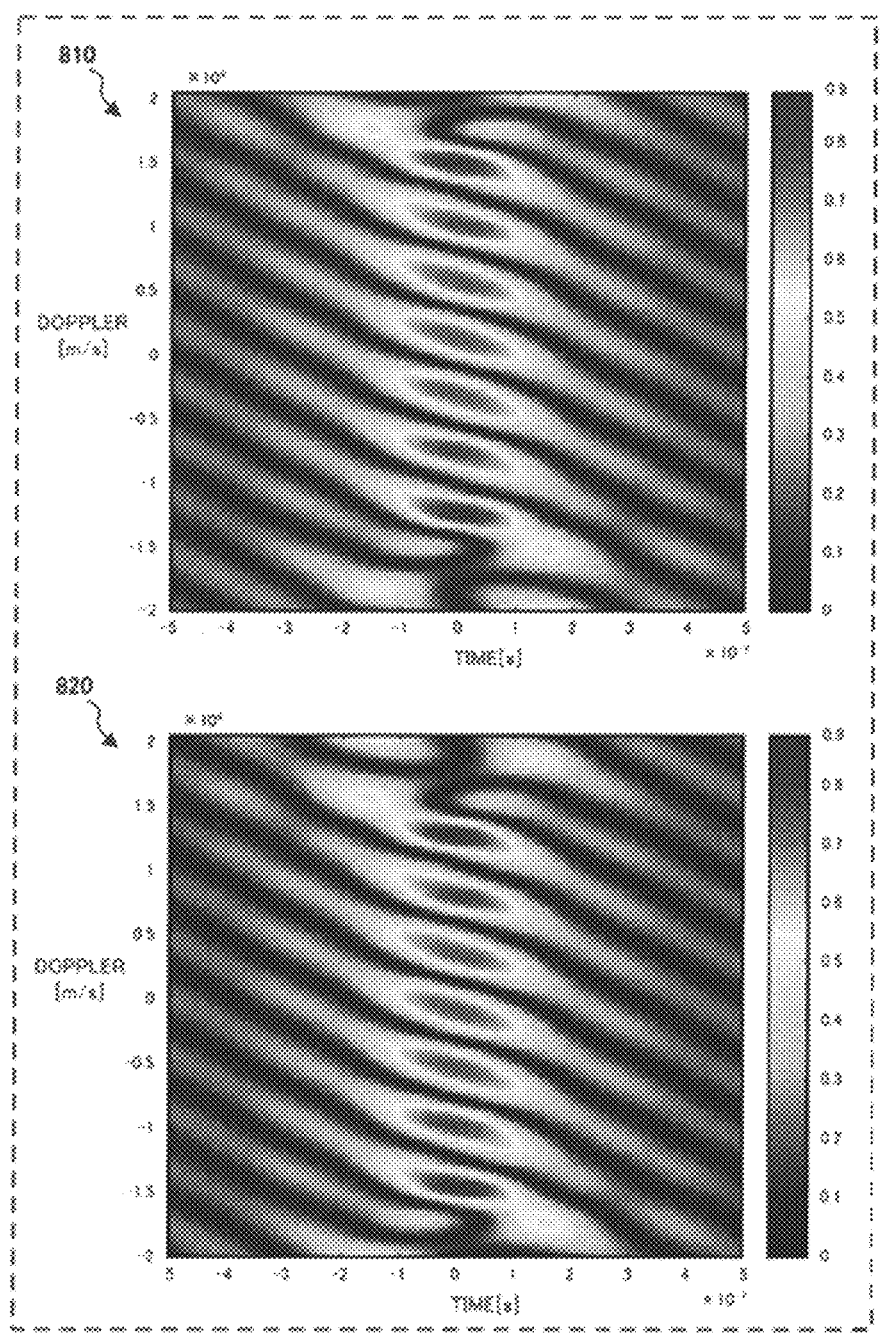
FIG. 8 is a diagram illustrating cross ambiguity functions according to the second example embodiment of the present invention.

FIG. 8 is a diagram illustrating cross ambiguity functions 810 and 820 according to the present example embodiment.

The cross ambiguity function 810 is a cross ambiguity function of a correlation waveform and a transmission waveform, the correlation waveform being generated by adding waveforms on which respective frequency corrections of 0.00075%, 0.00375%, 0.00675%, 0.00975%, −0.00225%, −0.00525%, and −0.00825% are performed to the BM-SFM waveform example of the spectrogram 610.

The cross ambiguity function 820 is a cross ambiguity function of a correlation waveform and a transmission waveform, the correlation waveform being generated by adding waveforms on which respective frequency corrections of 0.00225%, 0.00525%, 0.00825%, −0.00075%, −0.00375%, −0.00675%, and −0.00975% are performed to the BM-SFM waveform example of the same spectrogram 610.

Islands having a great value of an ambiguity function are aligned with few interference along the axis of time=0 in both of the cross ambiguity functions 810 and 820. Furthermore, in the cross ambiguity functions 810 and 820, the islands are complementary, added together to complement each other's separating portions, and continuous in a Doppler shift direction.

(Combined Cross Ambiguity Function)

Figure 9A:
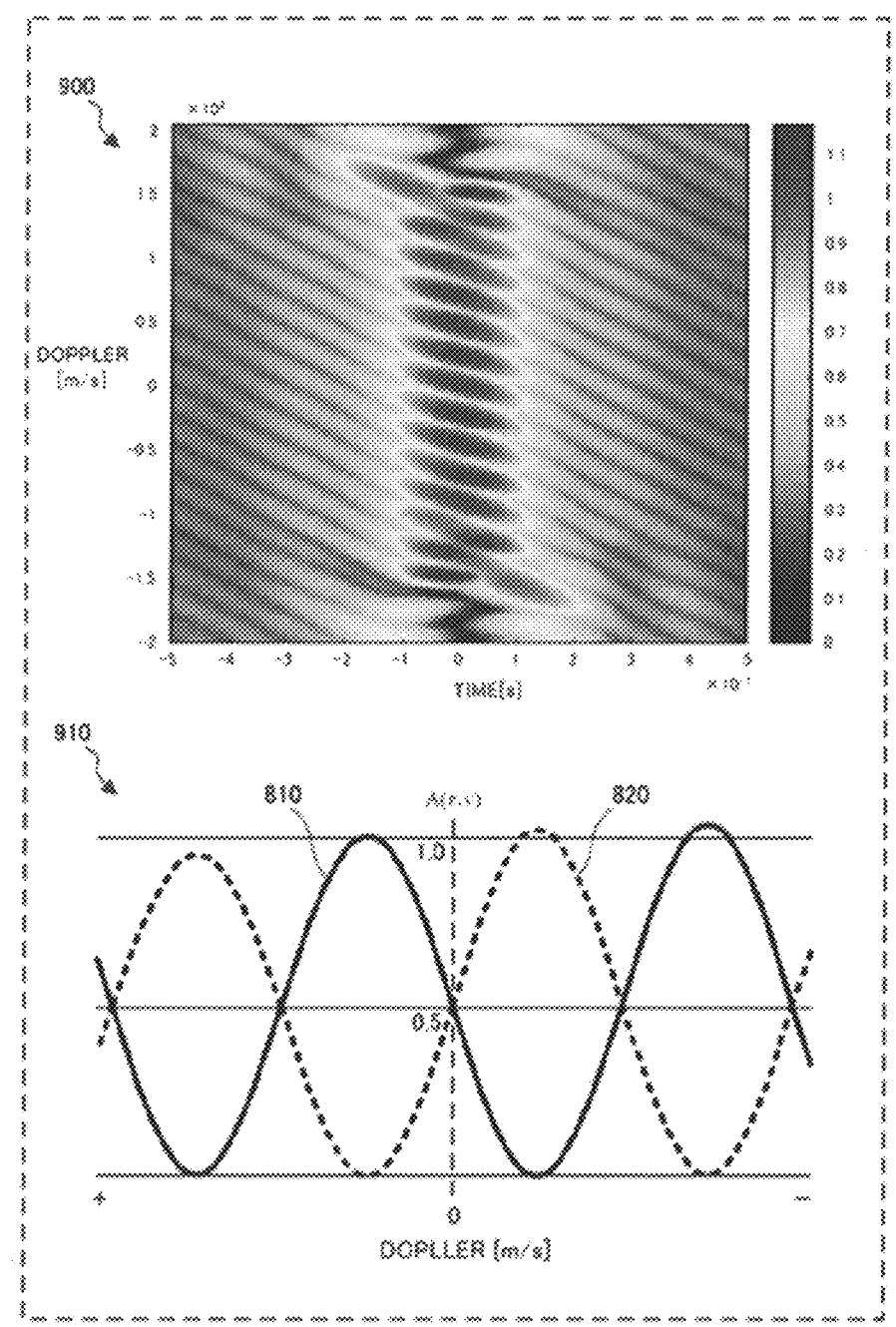
FIG. 9A is a diagram illustrating a combined cross ambiguity function and a combined state according to the second example embodiment of the present invention.

FIG. 9A is a diagram illustrating a combined cross ambiguity function 900 and a combined state 910 according to the present example embodiment.

The absolute values of the cross ambiguity functions 810 and 820 are taken and then added, and thus the islands having a great value of the ambiguity function are aligned without a gap along the axis of time=0 with few interference. This represents that detection of time is less affected by doppler, more specifically, detection of a distance that is less likely to be affected by a speed of a reflection object can be performed.

The combined state 910 in which the islands having a great value of the ambiguity function are aligned without a gap is, for example, a state where values of the cross-correlation functions of the cross ambiguity functions 810 and 820 overlap each other at about half of the maximum value. Note that the combined state is merely one example, and may be adjusted appropriately by another condition of the signal processing device 310.

(Detection of Target Object)

Figure 9B:
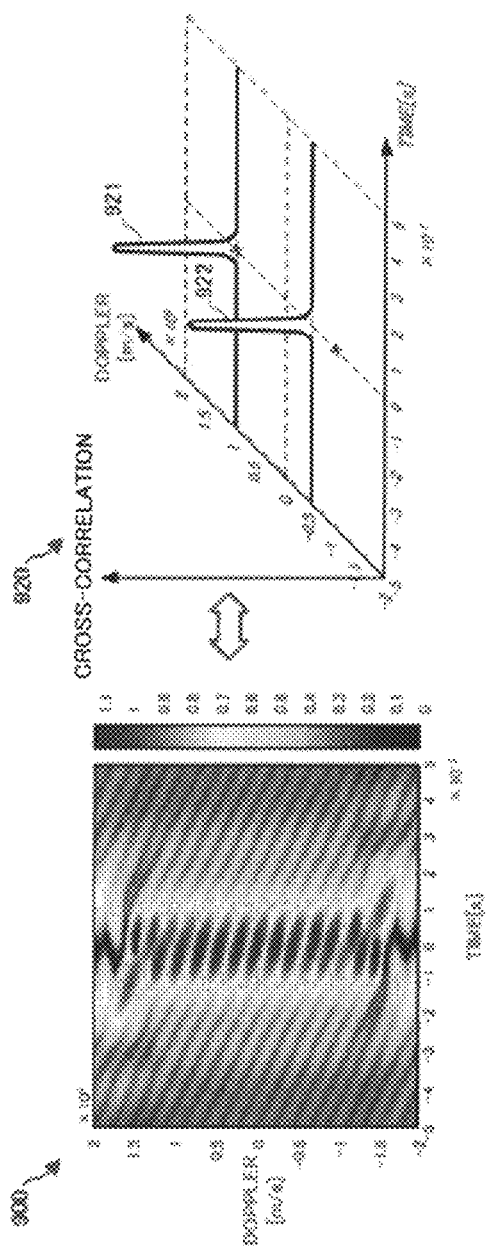
FIG. 9B is a diagram illustrating a relationship between the combined cross ambiguity function and a cross-correlation function to be output according to the second example embodiment of the present invention.

FIG. 9B is a diagram illustrating a relationship between the combined cross ambiguity function 900 and a cross-correlation function 920 to be output according to the present example embodiment.

FIG. 9B illustrates, as one example, the cross-correlation function 920 when objects at two different movement speeds are present. In the cross ambiguity function 900, results in which values of the cross-correlation functions are greater than or equal to a predetermined value are continuous in a Doppler shift direction, and thus a range from a stationary object to a high-speed object such as an artificial satellite and a rocket can be accurately detected without a break in a movement speed of a moving object.

<<Hardware Configuration of Signal Processing Device>>

Figure 10:
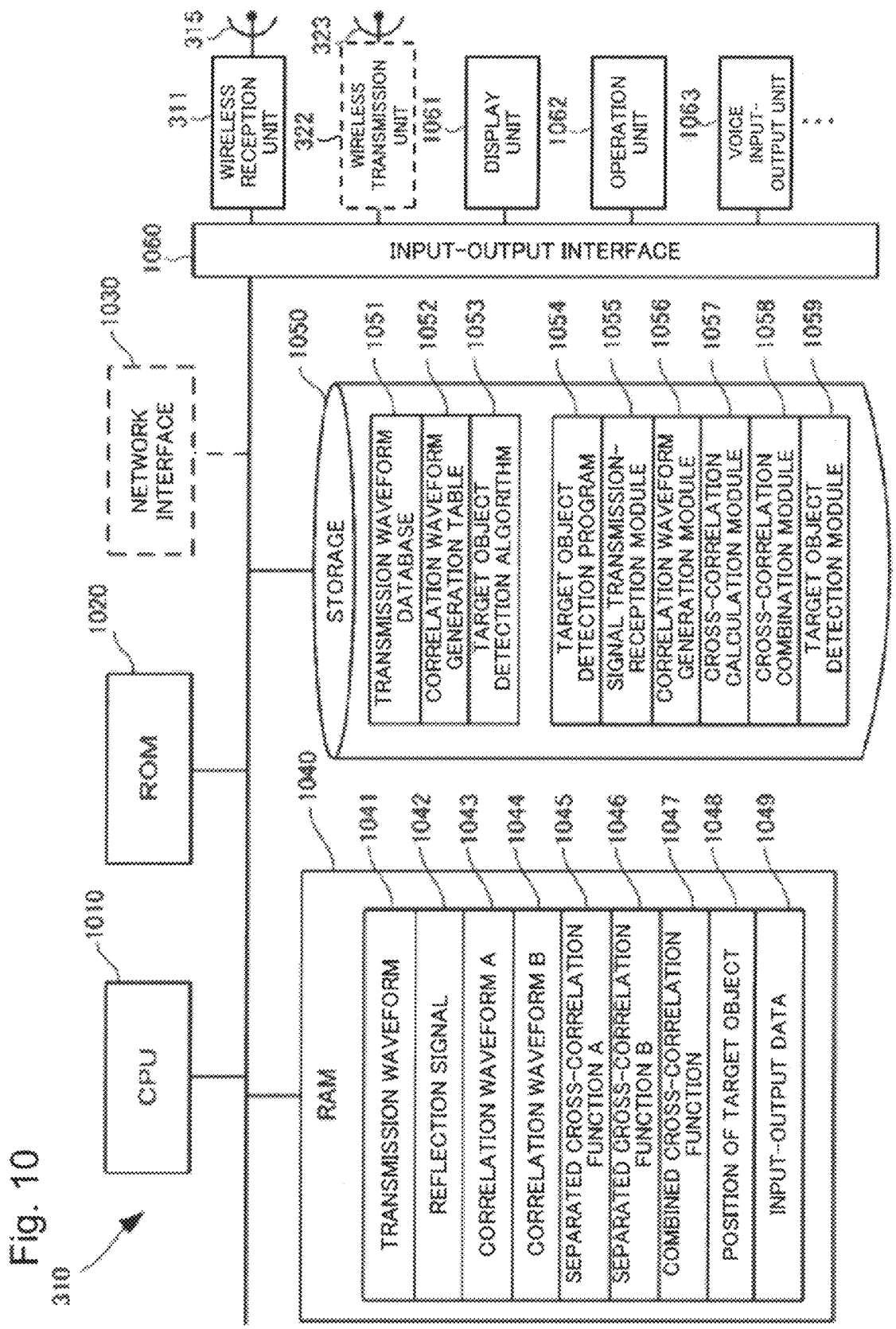
FIG. 10 is a block diagram illustrating a hardware configuration of the signal processing device according to the second example embodiment of the present invention.

FIG. 10 is a block diagram illustrating a hardware configuration of the signal processing device 310 according to the present example embodiment.

In FIG. 10, a central processing unit (CPU) 1010 is a processor for arithmetic control, and achieves the functional configuration units in FIGS. 3A, 4, and 5 by executing a program. Note that a plurality of the CPU 1010 may correspond to respective functions. A read only memory (ROM) 1020 stores fixed data, such as initial data and a program, and a program. A network interface 1030 controls communication with another device via a network.

A random access memory (RAM) 1040 is a random access memory used as a work area for a temporary memory by the CPU 1010. The RAM 1040 secures a region in which data needed for achieving the present example embodiment are stored. As a transmission waveform 1041, stored is a transmission waveform of a transmission signal that is to be used or has been used. As a reflection signal 1042, stored is a reflection signal reflected by a target object and received. As a correlation waveform A 1043, stored is a group of correlation waveforms generated based on the transmission waveform 1041 in the present example embodiment. As a correlation waveform B 1044, stored is another group of correlation waveforms generated based on the transmission waveform 1041 in the present example embodiment. The correlation waveform A 1043 and the correlation waveform B 1044 are generated in such a way that cross ambiguity functions are separated alternately and becomes continuous when being combined.

A separated cross-correlation function A 1045 is a cross-correlation calculation result of the correlation waveform A and a reception waveform of the reflection signal 1042. A separated cross-correlation function B 1046 is a cross-correlation calculation result of the correlation waveform B and a reception waveform of the reflection signal 1042. A combined cross-correlation function 1047 is a continuous cross-correlation calculation result acquired by combining the separated cross-correlation function B 1046 and the separated cross-correlation function B 1046. A position 1048 of a target object is information including a distance to a target object, a movement speed of a target object, or the like being acquired, based on the combined cross-correlation function 1047. Input-output data 1049 are data input to and output from an input-output apparatus including the wireless reception unit 311, via an input-output interface 1060.

A storage 1050 stores a database, various parameters, or the following data or program needed for achieving the present example embodiment. A transmission waveform database 1051 is a database that stores a transmission waveform to be used. A correlation waveform generation table 1052 is a table for correcting and then adding the used transmission waveform 1041, and generating the correlation waveform A 1043 and the correlation waveform B 1044. A target object recognition algorithm 1053 is an algorithm for detecting a target object in the present example embodiment.

The following program is stored in the storage 1050. A target object detection program 1054 is a program for controlling entire processing of the signal processing device 310 in the present example embodiment. A signal transmission-reception module 1055 is a module that controls transmission of a transmission signal and reception of a reflection signal. Note that, when the signal processing device 310 is a device including only a function of detecting a target object by reception of a reflection signal, the signal processing device 310 is operated only as a signal reception module. A correlation waveform generation module 1056 is a module that generates the correlation waveform A 1043 and the correlation waveform B 1044, based on the transmission waveform 1041, by using the correlation waveform generation table 1052. A cross-correlation calculation module 1057 is a module that calculates a cross-correlation between a reception waveform of a reflection signal and each correlation waveform. A cross-correlation combination module 1058 is a module that constitutes each cross-correlation function calculated by the cross-correlation calculation module 1057. A target object detection module 1059 is a module that detects a target object from the cross-correlation function combined by the cross-correlation combination module 1058.

The input-output interface 1060 is an interface for controlling data input to and output from an input-output device. In the present example embodiment, the wireless reception unit 311 that receives a signal from the reception antenna 315 and the wireless transmission unit 322 that transmits a signal to the transmission antenna 323 are connected to the input-output interface 1060. Note that, when the signal processing device 310 is a device including only a function of detecting a target object by reception of a reflection signal, the transmission antenna 323 and the wireless transmission unit 322 are not needed. A display unit 861, an operation unit 862, and a voice input-output unit 863 may be further connected to the input-output interface 1060.

Note that, a program and data related to a general-purpose function and another achievable function of the signal processing device 310 are not illustrated in the RAM 1040 and the storage 1050 in FIG. 10.

(Correlation Waveform Generation Table)

Figure 11:
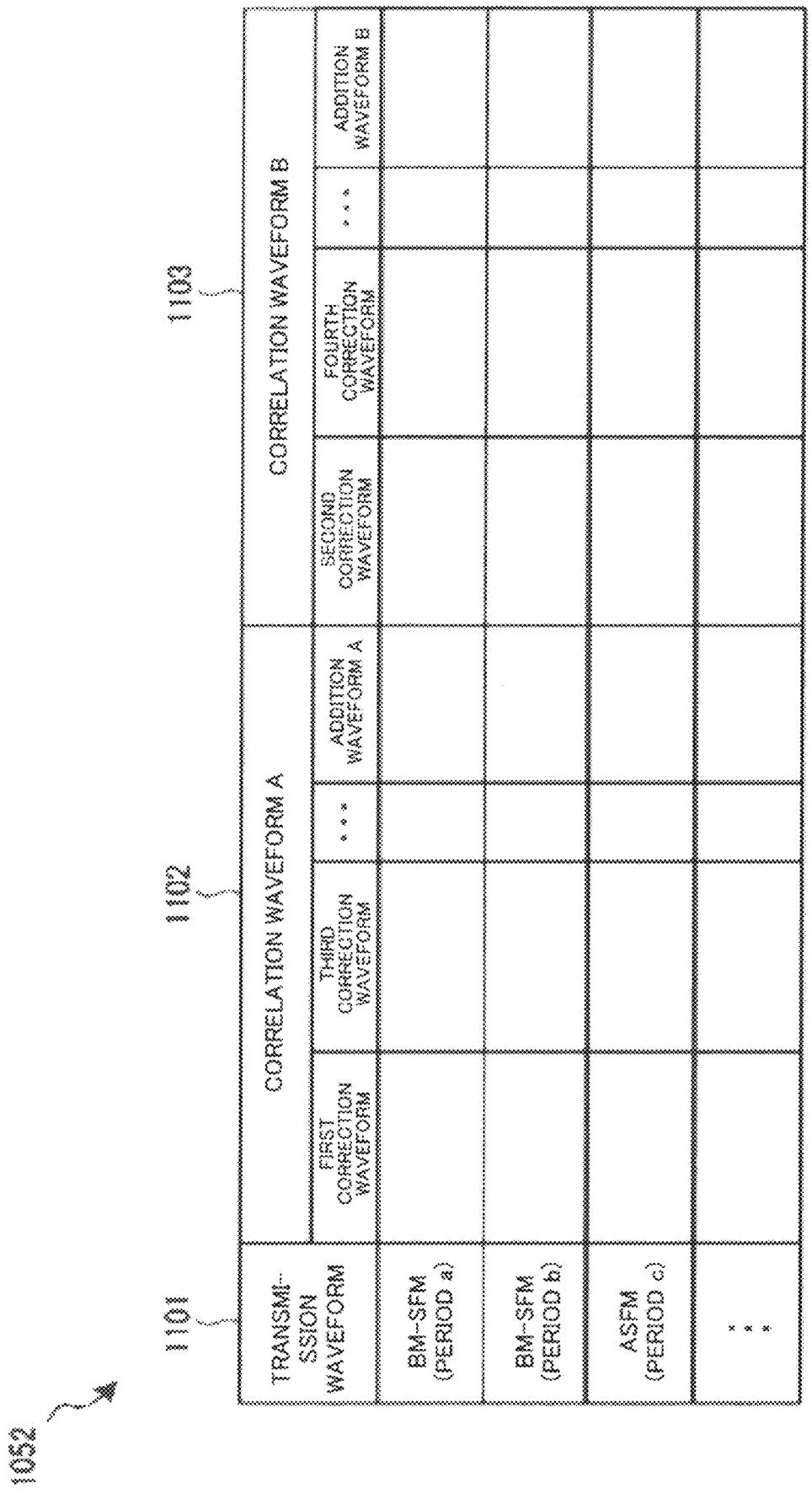
FIG. 11 is a diagram illustrating a configuration of a correlation waveform generation table according to the second example embodiment of the present invention.

FIG. 11 is a diagram illustrating a configuration of a correlation waveform generation table 1052 according to the present example embodiment. The correlation waveform generation table 1052 is used for generating a plurality of correction waveforms by slightly correcting a waveform based on a transmission waveform, adding the plurality of correction waveforms, and generating a correlation waveform.

The correlation waveform generation table 1052 stores, in association with the transmission waveform 1101, data 1102 for generating the correlation waveform A in the present example embodiment and data 1103 for generating the correlation waveform B. As the data 1102, a plurality of correction waveforms that generate the correlation waveform A and the correlation waveform A acquired by adding the plurality of waveforms are stored. As the data 1103, a plurality of correction waveforms that generate the correlation waveform B and the correlation waveform B acquired by adding the plurality of waveforms are stored. Note that the data 1102 about the correlation waveform A are indicated by a first correction waveform, a third correction waveform, and . . . , and the data 1103 about the correlation waveform B are indicated by a second correction waveform, a fourth correction waveform, and . . . , which indicates that correction is performed in such a way as to fill each other's gap in cross ambiguity functions.

Further, when a plurality of the transmission waveforms 1101 are selected and used, an appropriate correction waveform and an appropriate correlation waveform that correspond to each of the transmission waveforms 1101 are stored. Examples of the plurality of transmission waveforms 1101 include BM-SFM waveforms varying in period of a frequency change illustrated in FIG. 6 and ASFM waveforms, which is not limited thereto.

<<Processing Procedure of Signal Processing Device>>

Figure 12A:
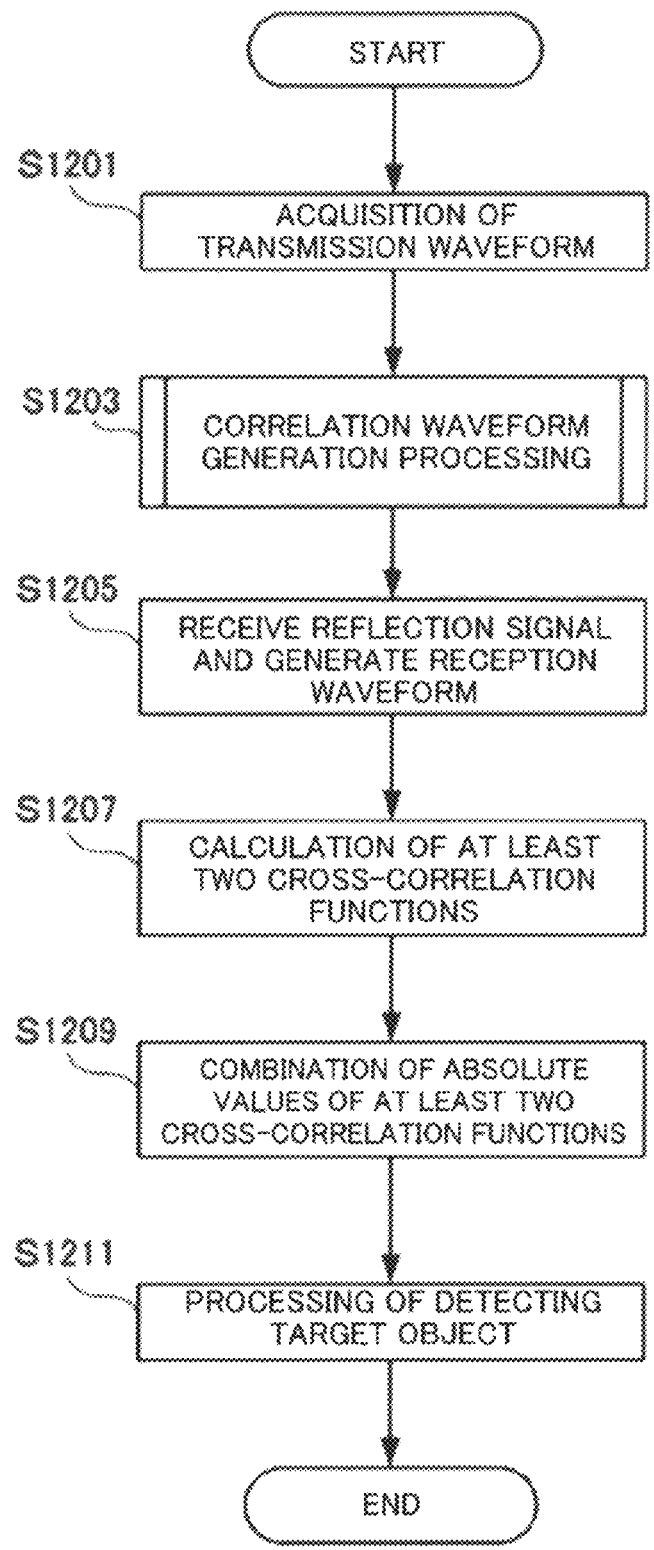
FIG. 12A is a flowchart illustrating a processing procedure of the signal processing device according to the second example embodiment of the present invention.

FIG. 12A is a flowchart illustrating a processing procedure of the signal processing device 310 according to the present example embodiment. This flowchart achieves the functional configuration units in FIGS. 3A, 4, and 5 by the CPU 1010 in FIG. 10 using and executing the RAM 1040.

In Step S1201, the signal processing device 310 acquires a transmission waveform. Note that, when the signal processing device 310 does not include a transmission function, a transmission waveform is acquired from the transmitter 320 or a storage unit (not illustrated) in which the transmission waveform is previously stored. When the signal processing device 310 includes a transmission function, a transmission waveform is acquired from the transmission waveform generation unit 321. In Step S1203, the signal processing device 310 performs correlation waveform generation processing of generating at least two correlation waveforms (two correlation waveforms in the present example) for calculating, based on the transmission waveform, a cross-correlation function of a reception waveform.

In Step S1205, the signal processing device 310 receives a reflection signal from a target object, and generates a reception waveform. In Step S1207, the signal processing device 310 calculates two cross-correlation functions from the reception waveform and the two correlation waveforms generated in Step S1203. In Step S1209, the signal processing device 310 combines absolute values of the two cross-correlation functions. Finally, in Step S1211, the signal processing device 310 detects a target object from the combined cross-correlation function.

(Correlation Waveform Generation Processing)

Figure 12B:
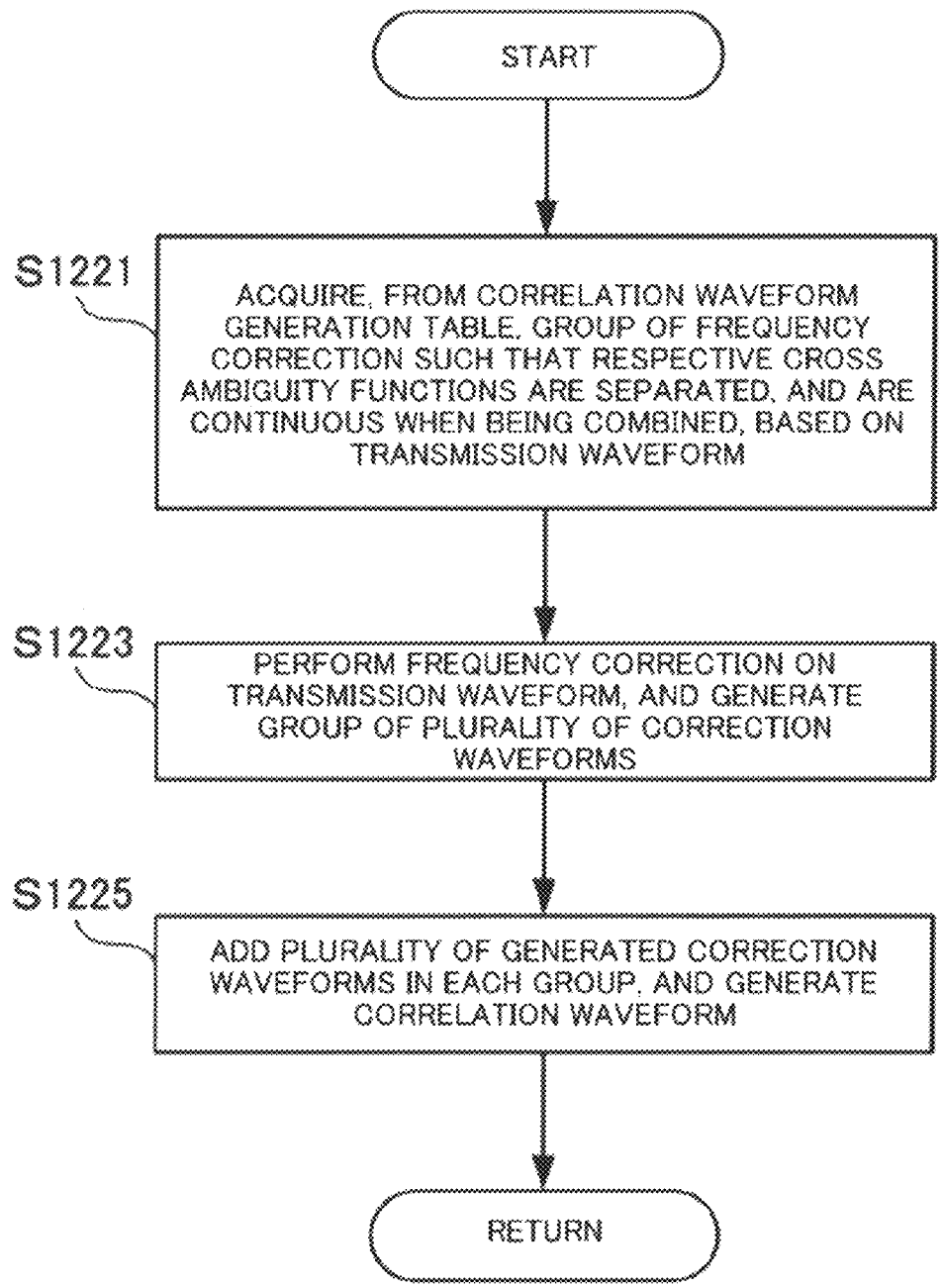
FIG. 12B is a flowchart illustrating a procedure for the correlation waveform generation processing according to the second example embodiment of the present invention.

FIG. 12B is a flowchart illustrating a procedure for the correlation waveform generation processing according to the present example embodiment.

In Step S1221, the signal processing device 310 acquires, from the correlation waveform generation table, a group of frequency correction in such a way that the respective cross ambiguity functions are separated in a Doppler effect direction (=movement speed direction), and island portions having a high cross-correlation function are continuous when the cross ambiguity functions are combined, based on the transmission waveform. The method of generating the group of frequency correction is described in FIG. 9A.

In Step S1223, the signal processing device 310 corrects the transmission waveform with the group of frequency correction acquired in Step S1221, and generates each group of a plurality of correction waveforms. Then, in Step S1225, the signal processing device 310 adds the plurality of generated correction waveforms in each group, and generates a correlation waveform.

According to the present example embodiment, a cross-correlation function is calculated in such a way that island portions having a high cross-correlation function are continuous in a cross ambiguity function, and thus a moving object can be accurately detected without being affected by a speed of the moving object. Further, a cross-correlation function is calculated by using two correlation waveforms to which a plurality of correction waveforms are previously added, and thus a moving object can be detected while a computation amount is reduced.

Third Example Embodiment

Next, a signal processing device according to a third example embodiment of the present invention is described.

The signal processing device according to the present example embodiment is different from that in the second example embodiment described above in that the signal processing device according to the present example embodiment outputs a maximum value of a cross-correlation function instead of adding an absolute value of a cross-correlation function. The other configuration and operation are similar to those in the second example embodiment, and thus the same configuration and operation are provided with the same reference signs, and detailed description thereof is omitted.

<<Functional Configuration of Signal Processing Device>>

Figure 13:
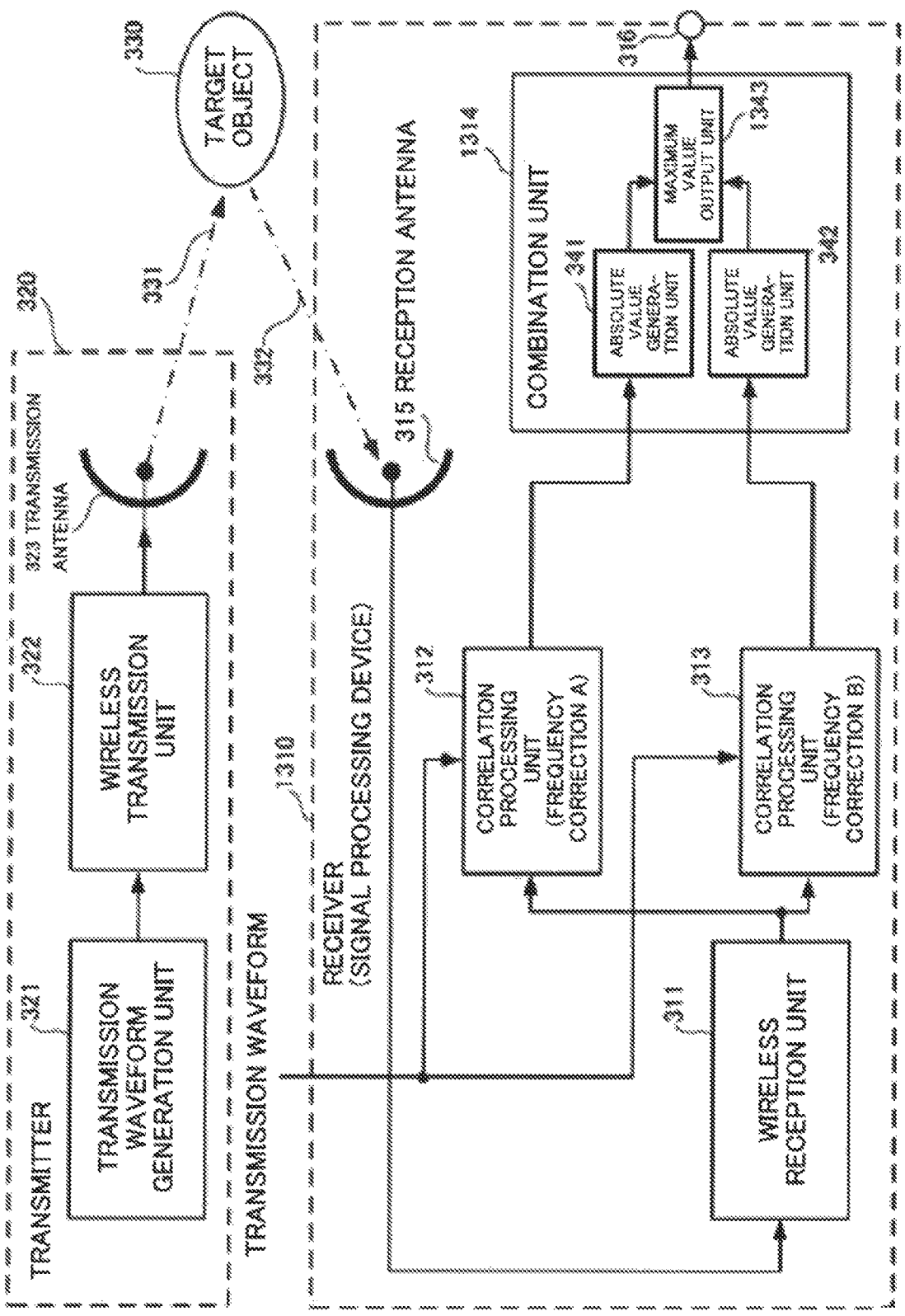
FIG. 13 is a block diagram illustrating a functional configuration of a signal processing device according to a third example embodiment of the present invention.

FIG. 13 is a block diagram illustrating a functional configuration of a signal processing device 1310 according to the present example embodiment. Note that a functional configuration diagram in FIG. 13 similar to that in FIG. 3A is provided with same reference sign, and the repeated description thereof is omitted.

A combination unit 1314 in FIG. 13 includes a maximum value output unit 1343 instead of the addition unit 343 in FIG. 3A. In other words, the combination unit 1314 performs combination by a maximum value computation instead of an addition computation. Islands having a great cross-correlation function can be continuous without interference even by the maximum value computation, and thus an effect similar to that in the second example embodiment is acquired.

Irregularities are less likely to be generated by addition when a cross-correlation function is seen along a doppler direction, and an interval between islands, namely, a frequency correction amount needs to be carefully designed in the second example embodiment. By contrast, there is also an advantage that irregularities do not become large by reducing an interval between islands in the present example embodiment.

(Combined Cross Ambiguity Function)

Figure 14:
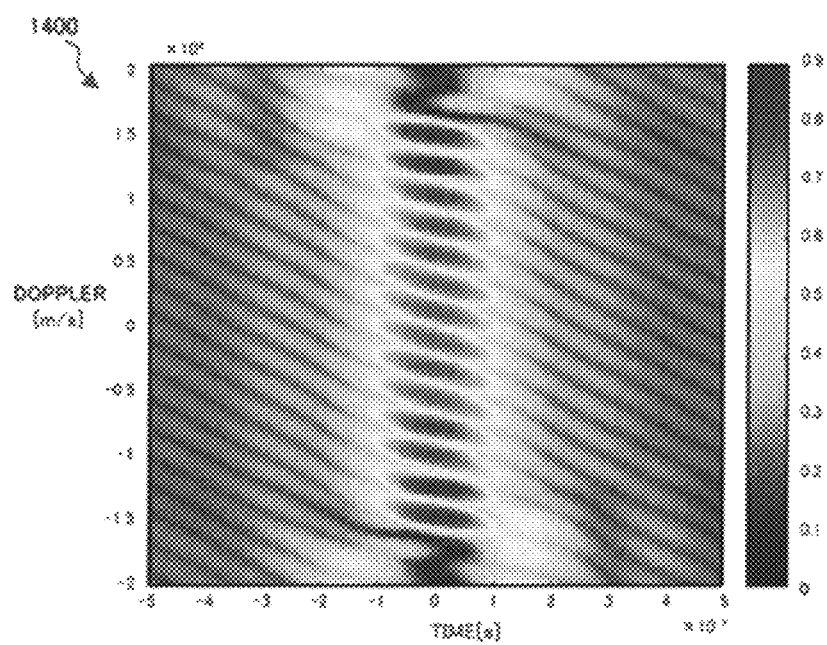
FIG. 14 is a diagram illustrating a combined cross ambiguity function according to the third example embodiment of the present invention.

FIG. 14 is a diagram illustrating a combined cross ambiguity function 1400 according to the present example embodiment.

The cross ambiguity function 1400 is a cross ambiguity function of a correlation function output from the combination unit 1314 in FIG. 13 by using, as a correlation waveform, the same waveform (see FIG. 6) as that in the second example embodiment. It is clear that, even when an output of the combination unit 1314 has a maximum value, regions having a great cross-correlation function are aligned without a gap in the doppler direction along the axis of time=0, similarly to the result in the second example embodiment in FIG. 9A. In other words, an effect similar to that in the second example embodiment is acquired.

Fourth Example Embodiment

Next, a signal processing device according to a fourth example embodiment of the present invention is described. The signal processing device according to the present example embodiment is different from that in the second example embodiment described above in that a correlation waveform to be generated is different. In other words, a transmission waveform itself is used for one correlation waveform. The other configuration and operation are similar to those in the second example embodiment, and thus the same configuration and operation are provided with the same reference signs, and detailed description thereof is omitted.

<<Processing Outline of Signal Processing Device>>

FIG. 15 is diagram for explaining a processing outline 1500 of the signal processing device according to the present example embodiment. Note that a component in FIG. 15 similar to that in FIG. 2 is provided with same reference sign, and the repeated description thereof is omitted.

A cross ambiguity function 152C as in a central diagram (b) in FIG. 15 is acquired in a cross-correlation function by a correlation waveform including a transmission waveform itself. This waveform is included in a waveform to which a transmission waveform itself (without performing frequency correction) is also added. As a result, islands are aligned with intervals around an island in an auto-ambiguity function 210. On the other hand, as illustrated in a central diagram (c) in FIG. 15, islands are aligned in a cross ambiguity function 152D in such a way as to fill a gap between the islands of the cross ambiguity function 152C, while avoiding the island of the auto-ambiguity function 210. Interference is reduced by leaving a gap between the islands in both of the central diagrams (b) and (c) in FIG. 15. A relationship for filling this gap, namely, a complementary relationship is similar to that in the second example embodiment, and an effect of combining cross-correlation functions is similar to that in the second example embodiment.

<<Functional Configuration of Signal Processing Device>>

Figure 16A:
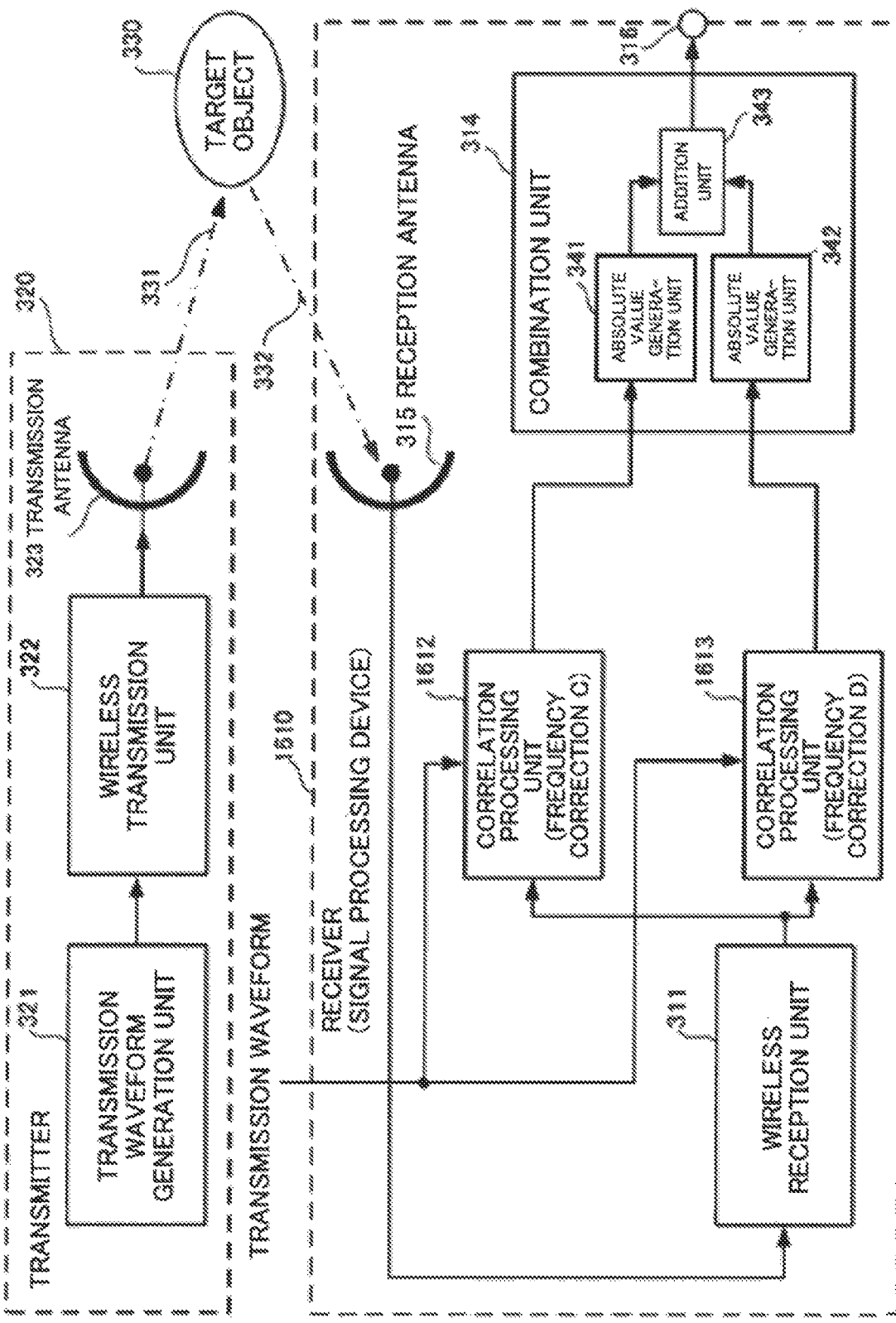
FIG. 16A is a block diagram illustrating a functional configuration of the signal processing device according to the fourth example embodiment of the present invention.

FIG. 16A is a block diagram illustrating a functional configuration of a signal processing device 1610 according to the present example embodiment. Note that a functional configuration unit in FIG. 16A similar to that in FIG. 3A is provided with same reference sign, and the repeated description thereof is omitted.

The signal processing device 1610 includes a correlation processing unit 1612 and a correlation processing unit 1613. The correlation processing unit 1612 generates a correlation waveform including a transmission waveform itself, calculates a cross-correlation function, and outputs the cross-correlation function to a combination unit 314. The correlation processing unit 1613 generates a correlation waveform in a relationship for filling a gap between islands in a calculation range of the correlation processing unit 1612, namely, a complementary relationship, calculates a cross-correlation function, and outputs the cross-correlation function to the combination unit 314.

(Correlation Waveform Generation Table)

Figure 16B:
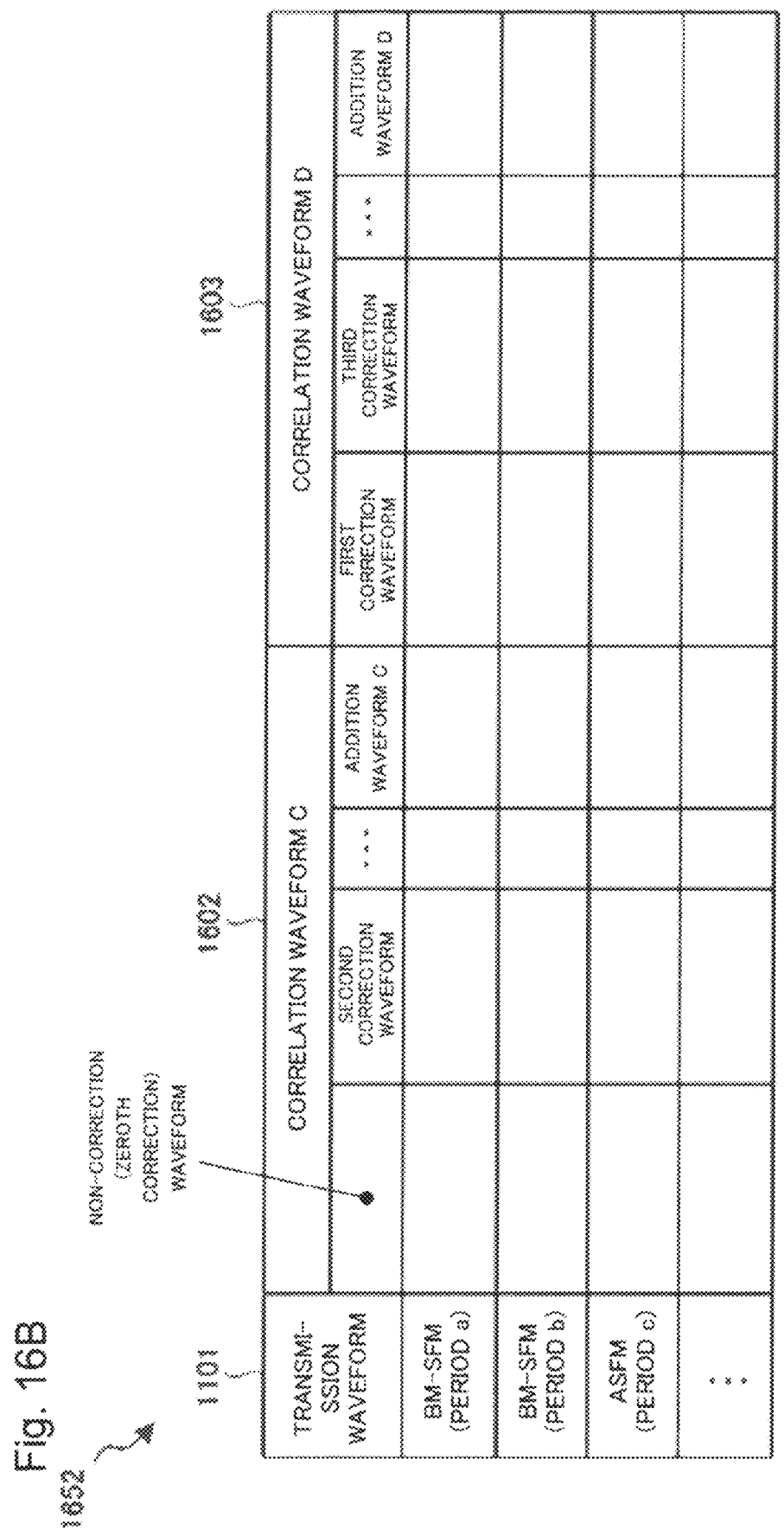
FIG. 16B is a diagram illustrating a configuration of a correlation waveform generation table according to the fourth example embodiment of the present invention.

FIG. 16B is a diagram illustrating a configuration of a correlation waveform generation table 1652 according to the present example embodiment. The correlation waveform generation table 1652 is used for generating a plurality of correction waveforms by slightly correcting a waveform based on a transmission waveform, adding the plurality of correction waveforms, and generating a correlation waveform. Note that a component in FIG. 16B similar to that in FIG. 11 is provided with same reference sign, and the repeated description thereof is omitted.

The correlation waveform generation table 1652 stores, in association with a transmission waveform 1101, data 1602 for generating a correlation waveform C in the present example embodiment and data 1603 for generating a correlation waveform D. As the data 1602, a plurality of correction waveforms and the correlation waveform C acquired by adding the plurality of waveforms are stored, the plurality of waveforms generating the correlation waveform C and including a non-correction transmission waveform. As the data 1603, a plurality of correction waveforms that generate the correlation waveform D and the correlation waveform D acquired by adding the plurality of waveforms are stored. Note that the data 1602 about the correlation waveform C are indicated by a zeroth correction waveform, a second correction waveform, and . . . , and the data 1603 about the correlation waveform D are indicated by a first correction waveform, a third correction waveform, and . . . , which indicates that correction is performed in such a way that the correlation waveform C includes a transmission waveform and each other's gap is filled in cross ambiguity functions.

Further, when a plurality of the transmission waveforms 1101 are selected and used, an appropriate correction waveform and an appropriate correlation waveform that correspond to each of the transmission waveforms 1101 are stored. Examples of the plurality of transmission waveforms 1101 include BM-SFM waveforms varying in period of a frequency change illustrated in FIG. 6 and ASFM waveforms, which is not limited thereto.

(Cross Ambiguity Function)

Figure 17:
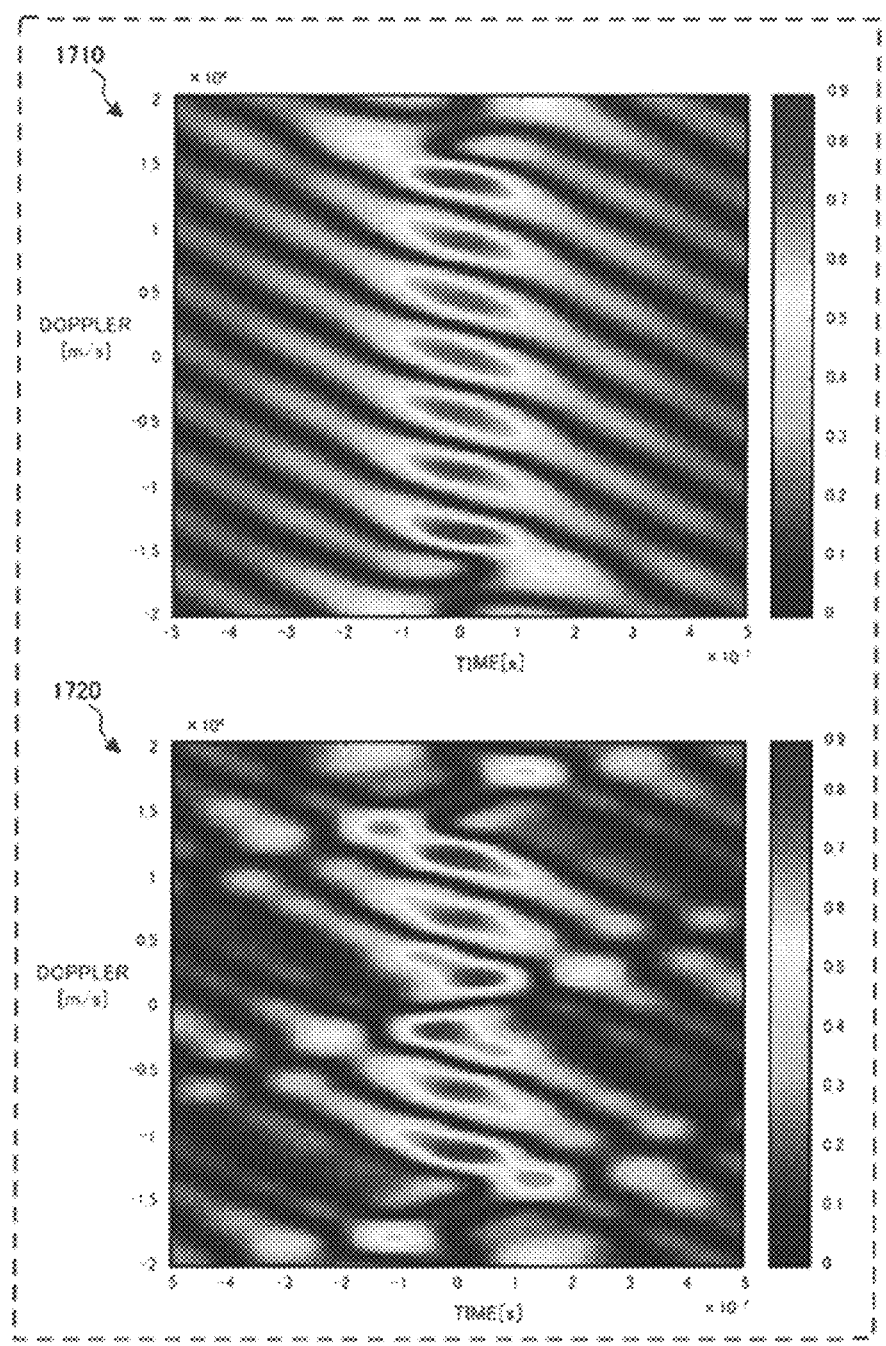
FIG. 17 is a diagram illustrating cross ambiguity functions according to the fourth example embodiment of the present invention.

FIG. 17 is a diagram illustrating cross ambiguity functions 1710 and 1720 according to the present example embodiment.

The cross ambiguity function 1710 is a cross ambiguity function of a correlation waveform and a transmission waveform, the correlation waveform being generated by adding a transmission waveform (corresponding to zero frequency correction) and waveforms on which respective frequency corrections of 0.003%, 0.006%, 0.009%, −0.003%, −0.006%, and −0.009% are performed to the BM-SFM waveform example of the spectrogram 610.

The cross ambiguity function 1720 is a cross ambiguity function of a correlation waveform and a transmission waveform, the correlation waveform being generated by adding waveforms on which respective frequency corrections of 0.0015%, 0.0045%, 0.0075%, −0.0015%, −0.0045%, and −0.0075% are performed to the BM-SFM waveform example of the same spectrogram 610.

Islands having a great value of an ambiguity function are aligned with few interference along the axis of time=0 in both of the cross ambiguity functions 1710 and 1720. Furthermore, in the cross ambiguity functions 1710 and 1720, the islands are complementary, added together to complement each other's separating portions, and continuous in a Doppler shift direction.

(Combined Cross Ambiguity Function)

Figure 18:
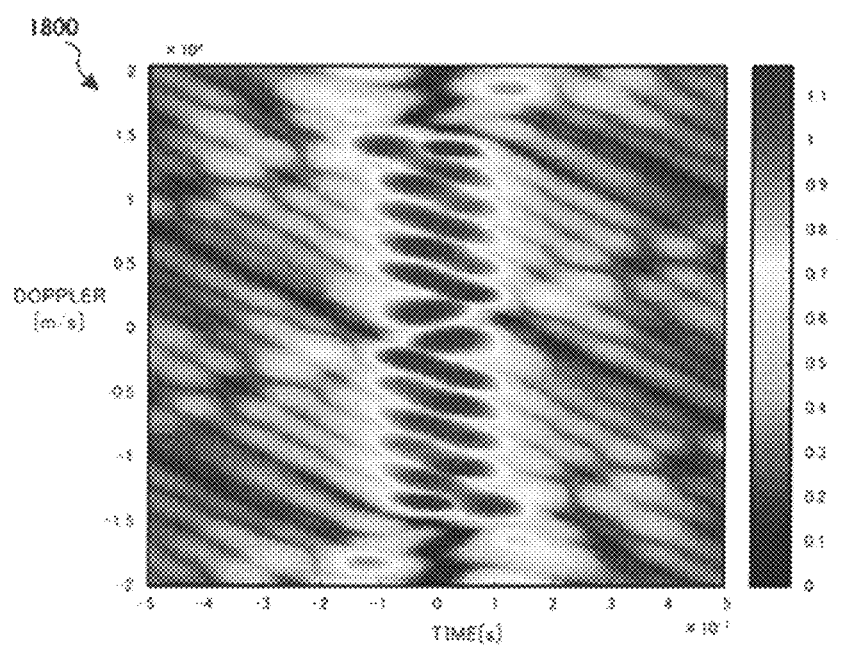
FIG. 18 is a diagram illustrating a combined cross ambiguity function according to the fourth example embodiment of the present invention.

FIG. 18 is a diagram illustrating a combined cross ambiguity function 1800 according to the present example embodiment.

The cross ambiguity function 1800 is a cross ambiguity function of a correlation function output from the combination unit 314 in FIG. 16A by using, as a correlation waveform, the same waveform (see FIG. 6) as that in the second example embodiment. It is clear that regions having a great ambiguity function are aligned without a gap on the axis of time=0, similarly to the second example embodiment and the third example embodiment.

According to the present example embodiment, an auto-correlation function can be used by a transmission waveform of zero frequency correction in addition to the effect in the above-described example embodiments, and thus a stationary object can be accurately detected.

Fifth Example Embodiment

Next, a signal processing device according to a fifth example embodiment of the present invention is described. The signal processing device according to the present example embodiment is different from that in the fourth example embodiment described above in that the signal processing device according to the present example embodiment outputs a maximum value of a cross-correlation function instead of adding an absolute value of a cross-correlation function. The other configuration and operation are similar to those in the second example embodiment, and thus the same configuration and operation are provided with the same reference signs, and detailed description thereof is omitted.

<<Functional Configuration of Signal Processing Device>>

Figure 19:
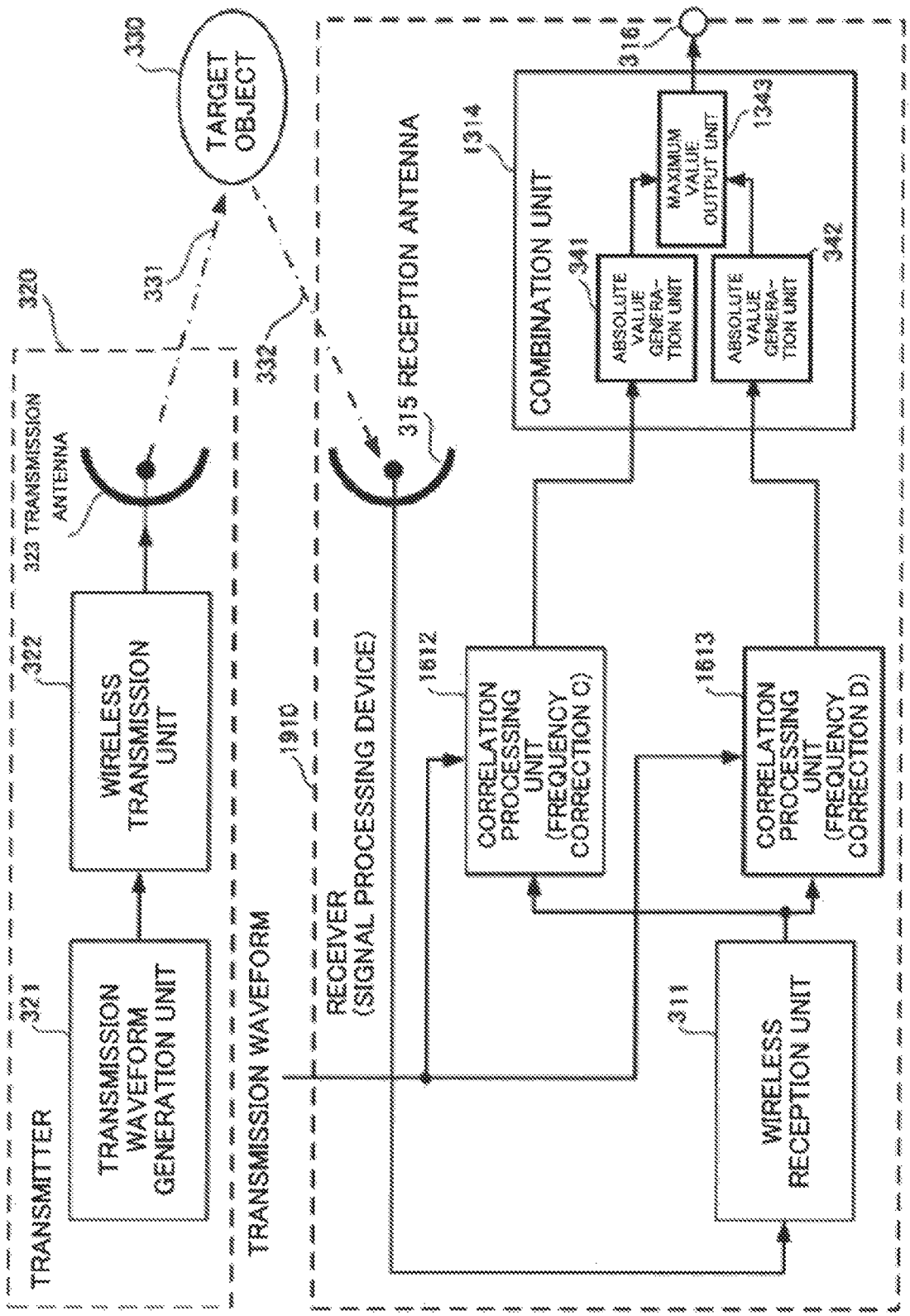
FIG. 19 is a block diagram illustrating a functional configuration of a signal processing device according to a fifth example embodiment of the present invention.

FIG. 19 is a block diagram illustrating a functional configuration of a signal processing device 1910 according to the present example embodiment. Note that a functional configuration unit in FIG. 19 similar to that in FIG. 16A is provided with same reference sign, and the repeated description thereof is omitted.

A combination unit 1314 in FIG. 19 includes a maximum value output unit 1343 instead of the addition unit 343 in FIG. 16A. In other words, the combination unit 1314 performs combination by a maximum value computation instead of an addition computation. Islands having a great cross-correlation function can be continuous without interference even by the maximum value computation, and thus an effect similar to that in the second example embodiment is acquired.

Irregularities are less likely to be generated by addition when a cross-correlation function is seen along a doppler direction, and an interval between islands, namely, a frequency correction amount needs to be carefully designed in the fourth example embodiment. By contrast, there is also an advantage that irregularities do not become large by reducing an interval between islands in the present example embodiment.

(Combined Cross Ambiguity Function)

Figure 20:
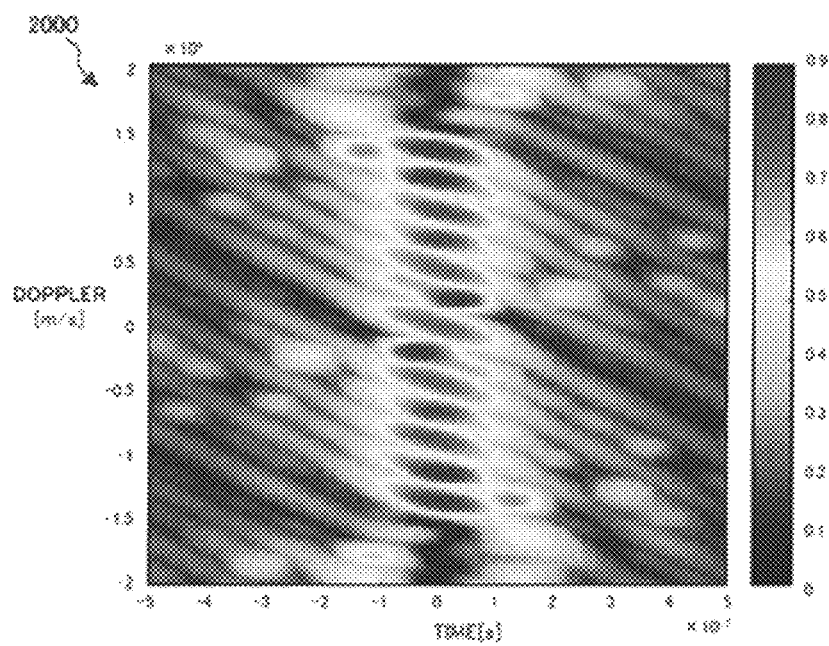
FIG. 20 is a diagram illustrating a combined cross ambiguity function according to the fifth example embodiment of the present invention.

FIG. 20 is a diagram illustrating a combined cross ambiguity function 2000 according to the present example embodiment.

The cross ambiguity function 2000 is a cross ambiguity function of a correlation function output from the combination unit 1314 in FIG. 19 by using, as a correlation waveform, the same waveform (see FIG. 6) as that in the fourth example embodiment. It is clear that, even when an output of the combination unit 1314 has a maximum value, regions having a great cross-correlation function are aligned without a gap in the doppler direction along the axis of time=0, similarly to the result in the fourth example embodiment in FIG. 18. In other words, an effect similar to that in the fourth example embodiment is acquired.

Sixth Example Embodiment

Next, a signal processing device according to a sixth example embodiment of the present invention is described. The signal processing device according to the present example embodiment is different from that in the second to fifth example embodiments described above in that a cross-correlation function is calculated from three correlation waveforms. The other configuration and operation are similar to those in the second example embodiment to the fifth example embodiment, and thus the same configuration and operation are provided with the same reference signs, and detailed description thereof is omitted.

<<Processing Outline of Signal Processing Device>>

Figure 21:
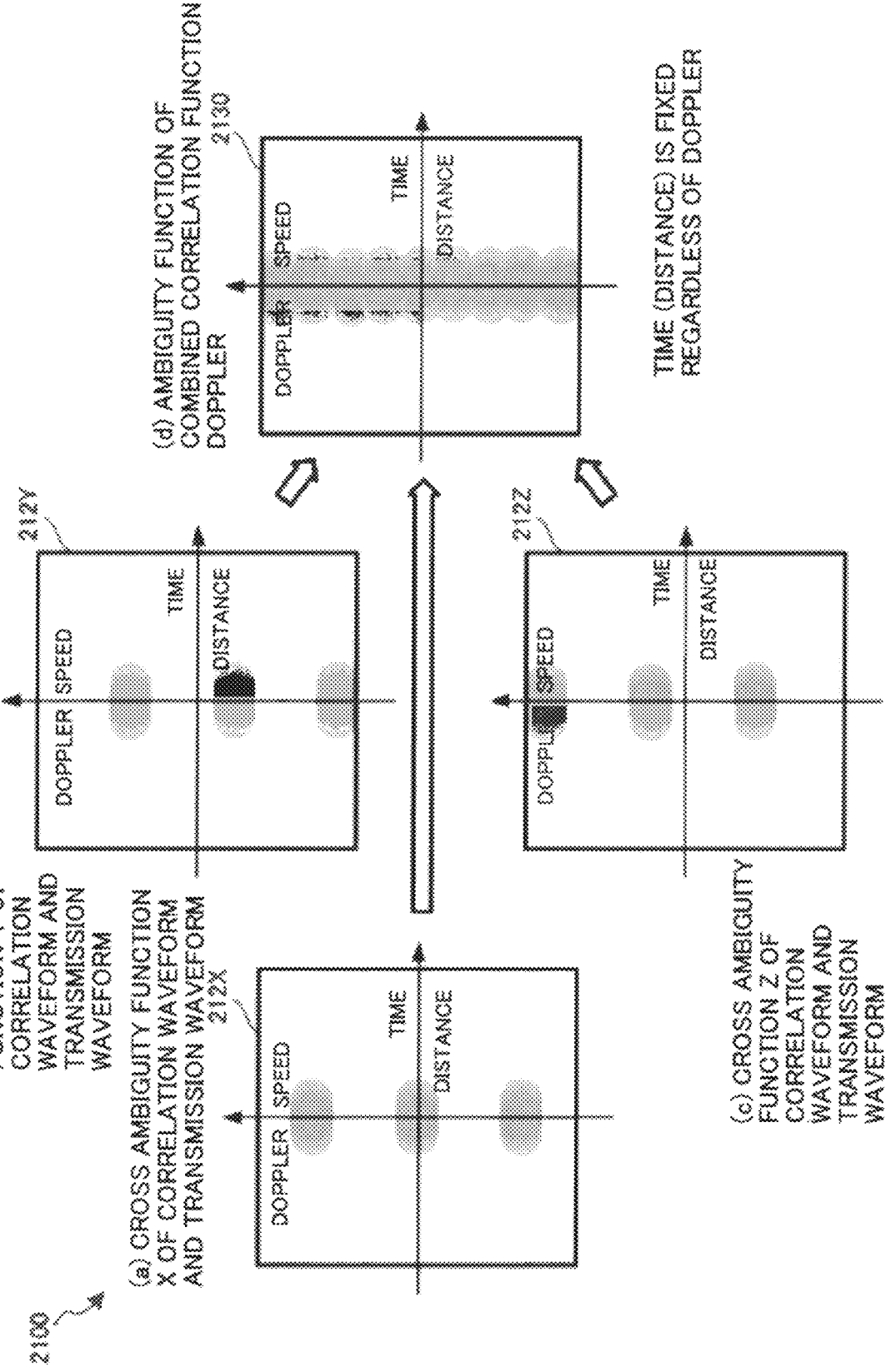
FIG. 21 is diagram for explaining a processing outline of a signal processing device according to a sixth example embodiment of the present invention.

FIG. 21 is diagram for explaining a processing outline 2100 of the signal processing device according to the present example embodiment. Note that FIG. 21 does not illustrate an auto-ambiguity function, but a transmission waveform (see FIG. 6) similar to that in the above-described example embodiments is used, and an auto-ambiguity function is the auto-ambiguity function 210.

In generation of the correlation waveform, a correlation waveform is generated in such a way that a plurality of islands appear. When a correction waveform is generated, correction waveforms with an insufficient distance of Doppler shift therebetween interfere with each other, and islands are not aligned. Then, by appropriately designing an amount of frequency correction, three cross ambiguity functions in which isolated islands are aligned are acquired as illustrated in 212X, 212Y, and 212Z in FIG. 21.

In the present example embodiment, three correlation waveforms, from which three cross ambiguity functions in which isolated islands are aligned in positions varying in amount of doppler shift alternately are acquired, are generated. Cross ambiguity functions of the three correlation waveforms and a reception waveform are cross ambiguity functions 212X, 212Y, and 212Z. When an amount of frequency correction is appropriately designed, islands can be formed at places that complement each other in the three cross ambiguity functions 212X, 212Y, and 212Z.

Processing and an effect of combination in the present example embodiment are described by using a right diagram (d) in FIG. 21. In the combination processing in the present example embodiment, an absolute value of each of three cross-correlation functions calculated from the reception waveform and the three correlation waveforms is taken and added. Since the cross-correlation functions are complex numbers, the cross-correlation functions interfere with each other when being added together as they are. However, the problem of interference can be reduced by adding an absolute value. As a result, as illustrated in the right diagram (d) in FIG. 21, an ambiguity function 2130 is acquired in such a way that the cross ambiguity functions 212X, 212Y, and 212Z are simply added together. This ambiguity function 2130 in the right diagram (d) in FIG. 21 is almost straight vertically, and it is clear that the ambiguity function 2130 is less likely to be affected by the vertical axis, namely, the Doppler effect. This represents that a time, namely, a distance in the horizontal axis can be properly detected even with the Doppler effect.

<<Functional Configuration of Signal Processing Device>>

Figure 22:
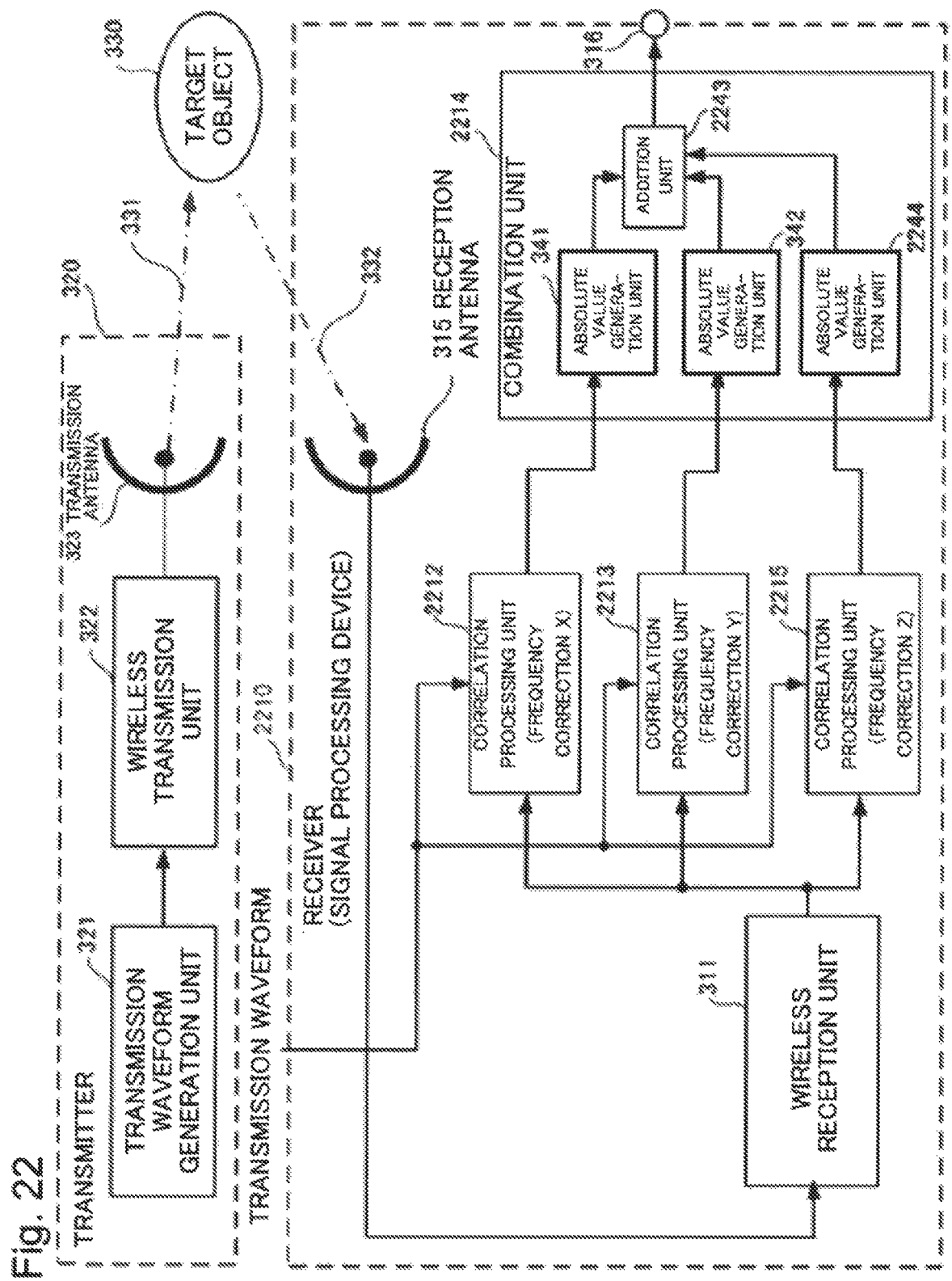
FIG. 22 is a block diagram illustrating a functional configuration of the signal processing device according to the sixth example embodiment of the present invention.

FIG. 22 is a block diagram illustrating a functional configuration of a signal processing device 2210 according to the present example embodiment. Note that a functional configuration unit in FIG. 22 similar to that in FIG. 3A is provided with same reference sign, and the repeated description thereof is omitted.

The signal processing device 2210 includes a correlation processing unit 2212, a correlation processing unit 2213, a correlation processing unit 2215, and a combination unit 2214. The correlation processing unit 2212 generates a first correlation waveform X, and calculates a cross-correlation function. The correlation processing unit 2213 generates a second correlation waveform Y, and calculates a cross-correlation function. The correlation processing unit 2215 generates a third correlation waveform Z, and calculates a cross-correlation function. The combination unit 2214 includes a third absolute value generation unit 2244 and an addition unit 2243 that adds absolute values of three cross-correlation functions.

(Correlation Waveform Generation Table)

FIG. 23 is a diagram illustrating a configuration of a correlation waveform generation table 2352 according to the present example embodiment. The correlation waveform generation table 2352 is used for generating a plurality of correction waveforms by slightly correcting a waveform based on a transmission waveform, adding the plurality of correction waveforms, and generating a correlation waveform. Note that a component in FIG. 23 similar to that in FIG. 11 is provided with same reference sign, and the repeated description thereof is omitted.

The correlation waveform generation table 2352 stores, in association with a transmission waveform 1101, data 2302 for generating the correlation waveform X in the present example embodiment, data 2303 for generating the correlation waveform Y, and data 2304 for generating the correlation waveform Z. As the data 2302, a plurality of correction waveforms that generate the correlation waveform X and the correlation waveform X acquired by adding the plurality of waveforms are stored. As the data 2303, a plurality of correction waveforms that generate the correlation waveform Y and the correlation waveform Y acquired by adding the plurality of waveforms are stored. As the data 2304, a plurality of correction waveforms that generate the correlation waveform Z and the correlation waveform Z acquired by adding the plurality of waveforms are stored. Note that the data 2302 about the correlation waveform X are indicated by a first correction waveform, a fourth correction waveform, and . . . , the data 2303 about the correlation waveform Y are indicated by a second correction waveform, a fifth correction waveform, and . . . , and the data 2304 about the correlation waveform Z are indicated by a third correction waveform, a sixth correction waveform, and . . . , which indicates that correction is performed in such a way as to fill each other's gap in cross ambiguity functions.

Further, when a plurality of the transmission waveforms 1101 are selected and used, an appropriate correction waveform and an appropriate correlation waveform that correspond to each of the transmission waveforms 1101 are stored. Examples of the plurality of transmission waveforms 1101 include BM-SFM waveforms varying in period of a frequency change illustrated in FIG. 6 and ASFM waveforms, which is not limited thereto.

According to the present example embodiment, an effect similar to that in the above-described example embodiments is acquired by appropriately disposing an island in each cross ambiguity function. Further, an interval between islands in each cross ambiguity function is greater than that in FIG. 8. In this way, interference in the correlation processing unit is reduced by increasing an amount of frequency correction, and a possibility of false detection can be reduced. Note that it is clear that a greater number of the correlation processing units may be used instead of three. Interference can be further reduced by redesigning a correlation waveform similarly.

Note that the BM-SFM waveform example of the spectrogram 610 in FIG. 6 is used as a transmission waveform and described in the above-described example embodiments, which is not limited thereto. Anyway, a waveform may not have a high peak generated other than a central portion in a cross ambiguity function of a transmission waveform. Further, power, a waveform amplitude, and a frequency preferably fall within a fixed range in order to avoid a burden on the wireless transmission unit. One example thereof is illustrated in a seventh example embodiment below.

Seventh Example Embodiment

Next, a signal processing device according to a seventh example embodiment of the present invention is described. The signal processing device according to the present example embodiment is different from that in the second to sixth example embodiments described above in that the ASFM used in PTL 1 is used as a transmission waveform. The other configuration and operation are similar to those in the second example embodiment to the sixth example embodiment, and thus the same configuration and operation are provided with the same reference signs, and detailed description thereof is omitted.

(Spectrogram of Transmission Waveform)

FIG. 24 is a diagram illustrating a spectrogram 2400 of a transmission waveform according to the present example embodiment. The transmission waveform in the present example embodiment is the ASFM waveform used in PTL 1.

It is clear from FIG. 24 that this waveform is a FM modulated wave (SFM) having a frequency vibrating sinusoidally, and modulation is further performed on this waveform in such a way that a change speed of FM modulation of the SFM is increased.

(Auto-Ambiguity Function)

FIG. 25 is a diagram illustrating an auto-ambiguity function 2500 according to the present example embodiment.

The auto-ambiguity function 2500 of the ASFM waveform is slightly inclined obliquely as compared with the auto-ambiguity functions 710 and 720 of the BM-SFM, but can be sufficiently used for addition by a cross ambiguity function in the present example embodiment.

(Cross Ambiguity Function)

Figure 26:
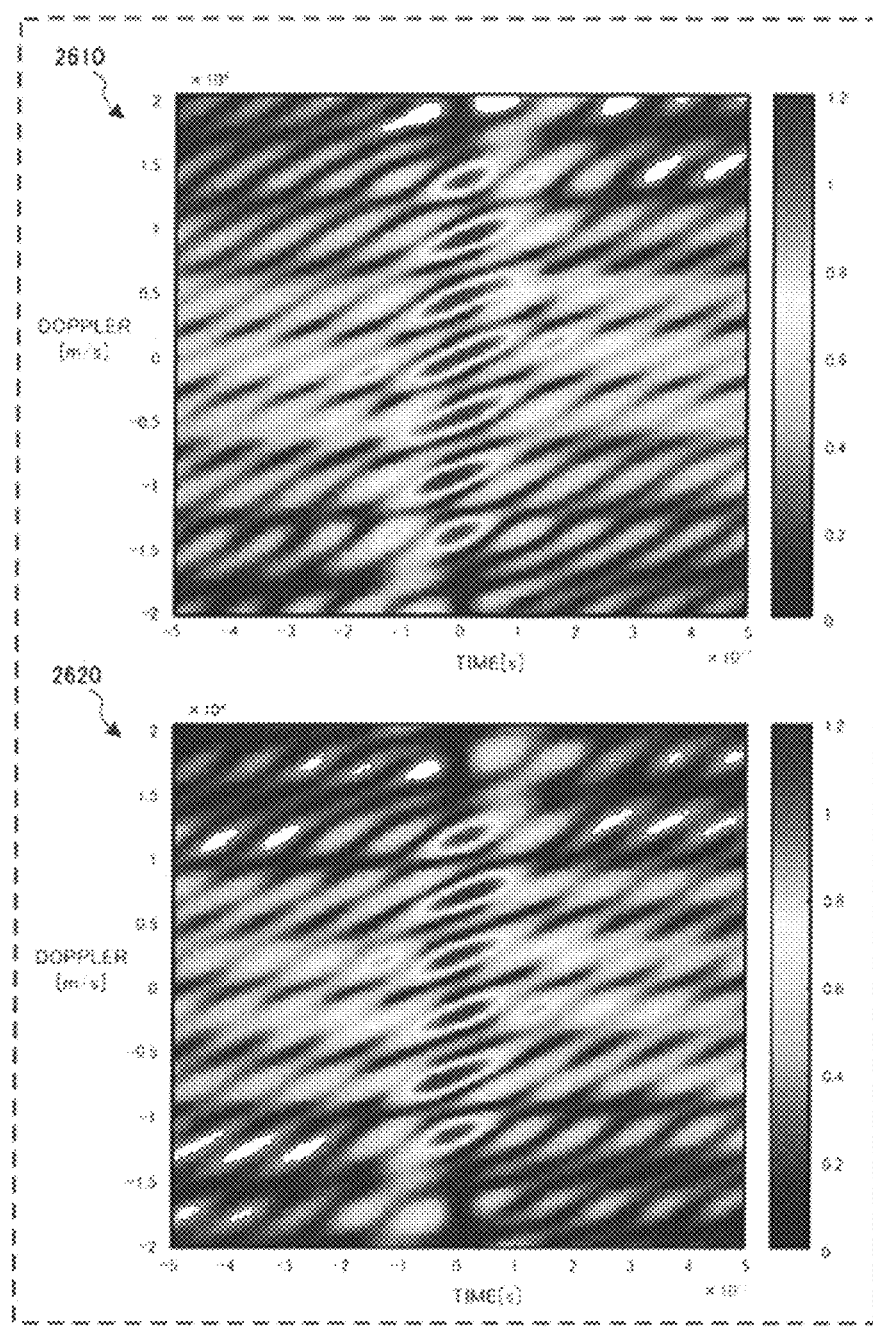
FIG. 26 is a diagram illustrating cross ambiguity functions according to the seventh example embodiment of the present invention.

FIG. 26 is a diagram illustrating cross ambiguity functions 2610 and 2620 according to the present example embodiment.

Also in the cross ambiguity functions 2610 and 2620, islands are aligned in a complementary relationship on the axis of time=0. More finer interferences appear than that in the second example embodiment, but is lower than the axis of time=0. It is clear that an effect similar to that in the above-described example embodiments is acquired by combining the two cross-correlation functions.

Eighth Example Embodiment

Next, a signal processing device according to an eighth example embodiment of the present invention is described. The signal processing device according to the present example embodiment is different from that in the second example embodiment to the seventh example embodiment described above in that an object in a separated frequency region is eliminated from a detection target by separating a cross ambiguity function in a desired frequency region, instead of making a cross ambiguity function to be continuous over a frequency region including a vicinity of 0, and a target object is efficiently detected. The other configuration and operation are similar to those in the second example embodiment to the seventh example embodiment, and thus the same configuration and operation are provided with the same reference signs, and detailed description thereof is omitted.

<<Processing Outline of Signal Processing Device>>

Figure 27:
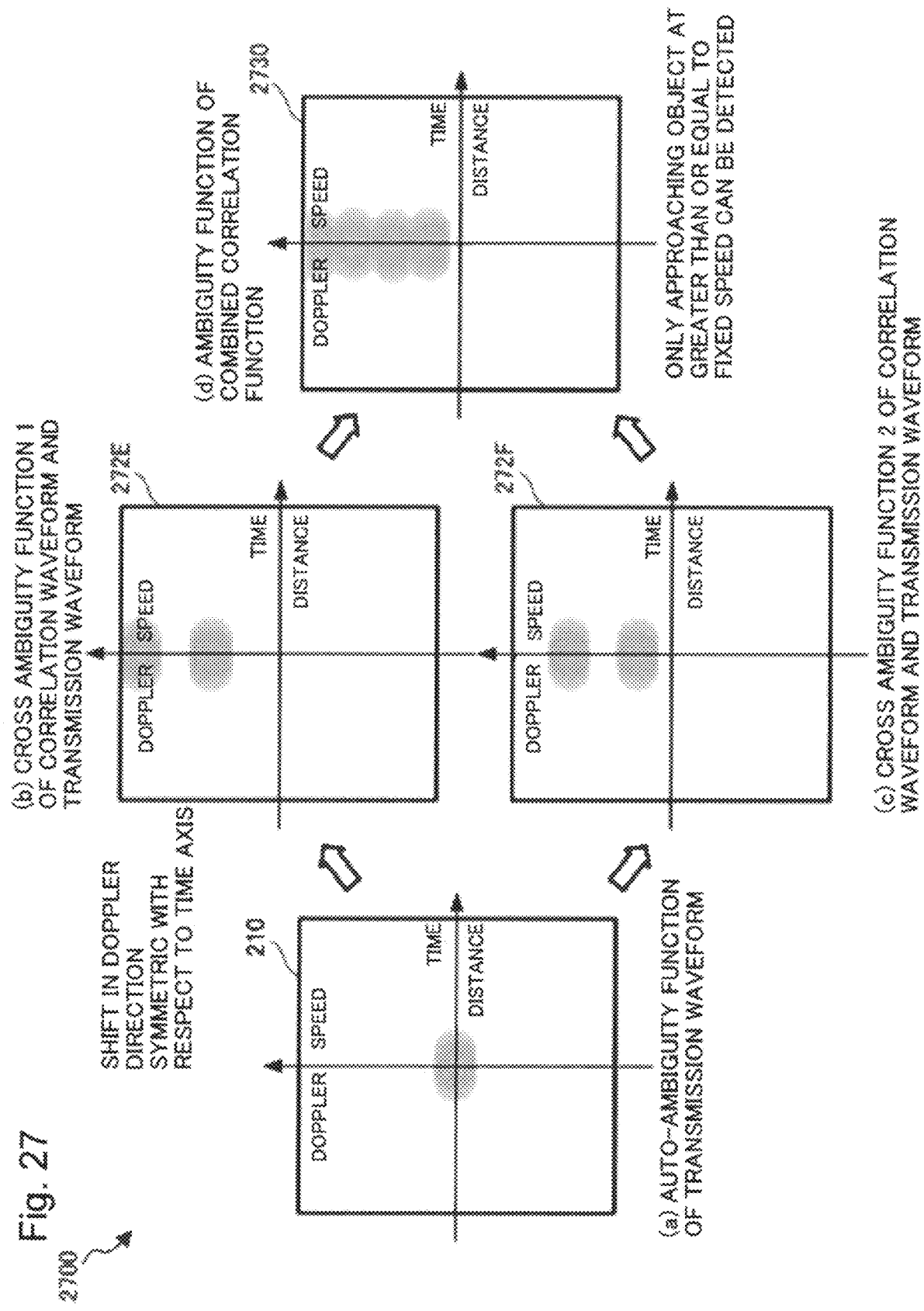
FIG. 27 is diagram for explaining a processing outline of a signal processing device according to an eighth example embodiment of the present invention.

FIG. 27 is diagram for explaining a processing outline 2700 of the signal processing device according to the present example embodiment. Note that a component in FIG. 27 similar to that in FIG. 2 is provided with same reference sign, and the repeated description thereof is omitted.

As illustrated in a central diagram (b) in FIG. 27, a cross ambiguity function 272E that avoids an island of an auto-ambiguity function 210 by selecting a desired correction waveform generation unit of a correlation waveform generation unit in a correlation processing unit can be acquired. On the other hand, as illustrated in a central diagram (c) in FIG. 27, islands are aligned in a cross ambiguity function 272F in such a way as to fill a gap between islands of the cross ambiguity function 272F, while avoiding the island of the auto-ambiguity function 210 and a negative frequency region, by selecting a different correction waveform generation unit of the correlation waveform generation unit in the correlation processing unit. Interference is reduced by leaving a gap between the islands in both of the central diagrams (b) and (c) in FIG. 27. However, the effect of combining cross-correlation functions is different from that in the second example embodiment, and a separating portion is generated in the negative frequency region including zero frequency as in a right diagram (d) in FIG. 27. In a case of the cross ambiguity function, a stationary object and an object moving away are not covered by detection, and only an object approaching at faster than or equal to a fixed speed can be efficiently detected.

Figure 28:
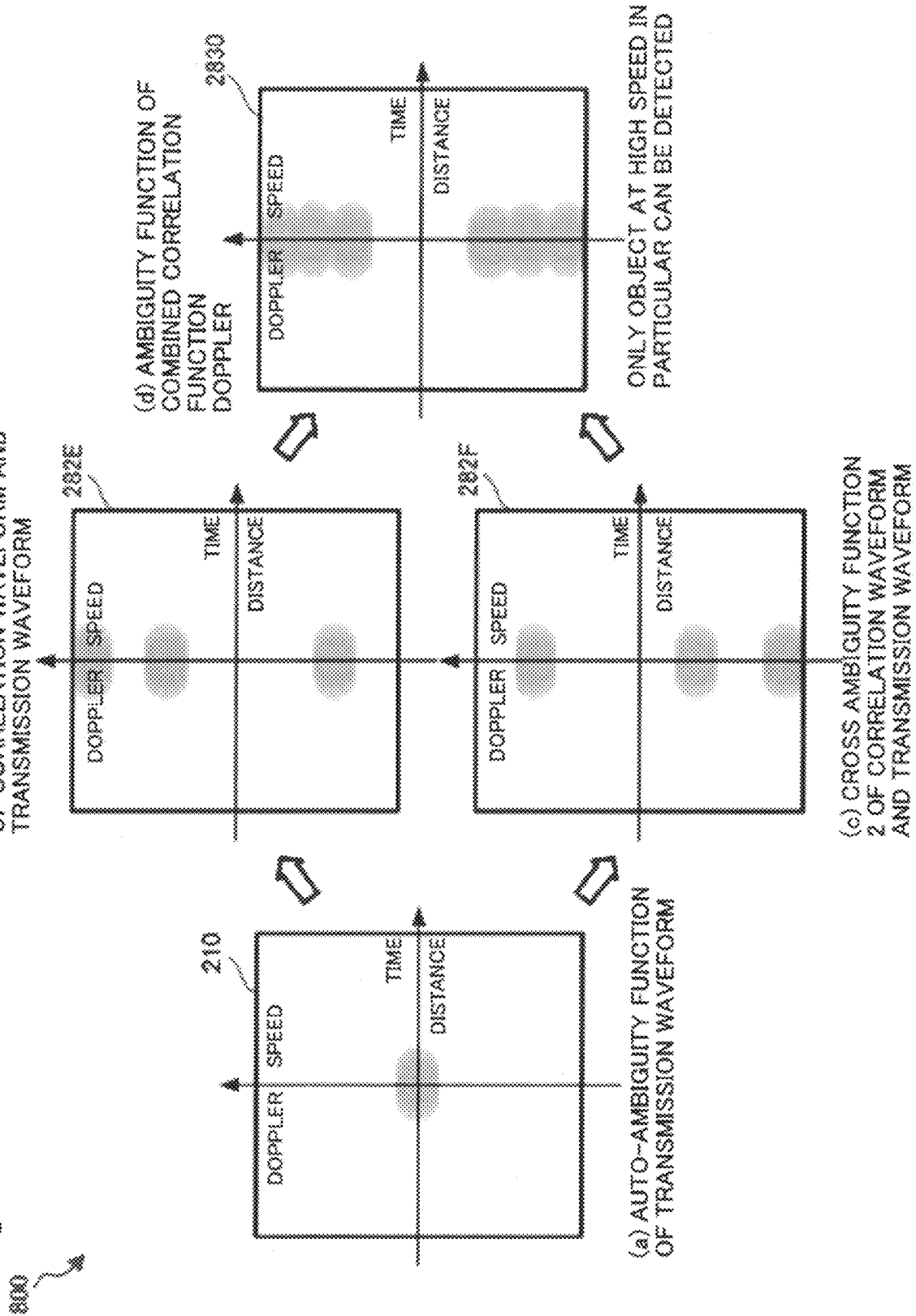
FIG. 28 is diagram for explaining another processing outline of the signal processing device according to the eighth example embodiment of the present invention.

FIG. 28 is diagram for explaining a processing outline 2800 of the signal processing device according to the present example embodiment. Note that a component in FIG. 28 similar to that in FIG. 2 is provided with same reference sign, and the repeated description thereof is omitted.

As illustrated in a central diagram (b) in FIG. 28, a cross ambiguity function 282E that avoids an island of an auto-ambiguity function 210 by selecting a desired correction waveform generation unit of a correlation waveform generation unit in a correlation processing unit can be acquired. On the other hand, as illustrated in a central diagram (c) in FIG. 28, islands are aligned in a cross ambiguity function 282F in such a way as to fill a gap between islands of the cross ambiguity function 282F, while avoiding the island of the auto-ambiguity function 210, by selecting a different correction waveform generation unit of the correlation waveform generation unit in the correlation processing unit. Interference is reduced by leaving a gap between the islands in both of the central diagrams (b) and (c) in FIG. 28. However, the effect of combining cross-correlation functions is different from that in the second example embodiment, and a separating portion is generated in a frequency region including zero frequency as in a right diagram (d) in FIG. 28. In a case of the cross ambiguity function, a stationary object and a moving object at slower than or equal to a predetermined speed are not covered by detection, and only a moving object at faster than or equal to a fixed speed can be efficiently detected.

Note that interference is reduced by leaving a gap between islands in the correlation processing unit by combining selections of the correction waveform generation unit of the correlation waveform generation unit in the correlation processing unit, and a desired speed (including a standstill) can also be excluded from a detection target and, conversely, a moving object only in a predetermined speed range can be selectively detected by generating a separating portion in a desired frequency region.

<<Functional Configuration of Signal Processing Device>>

Figure 29:
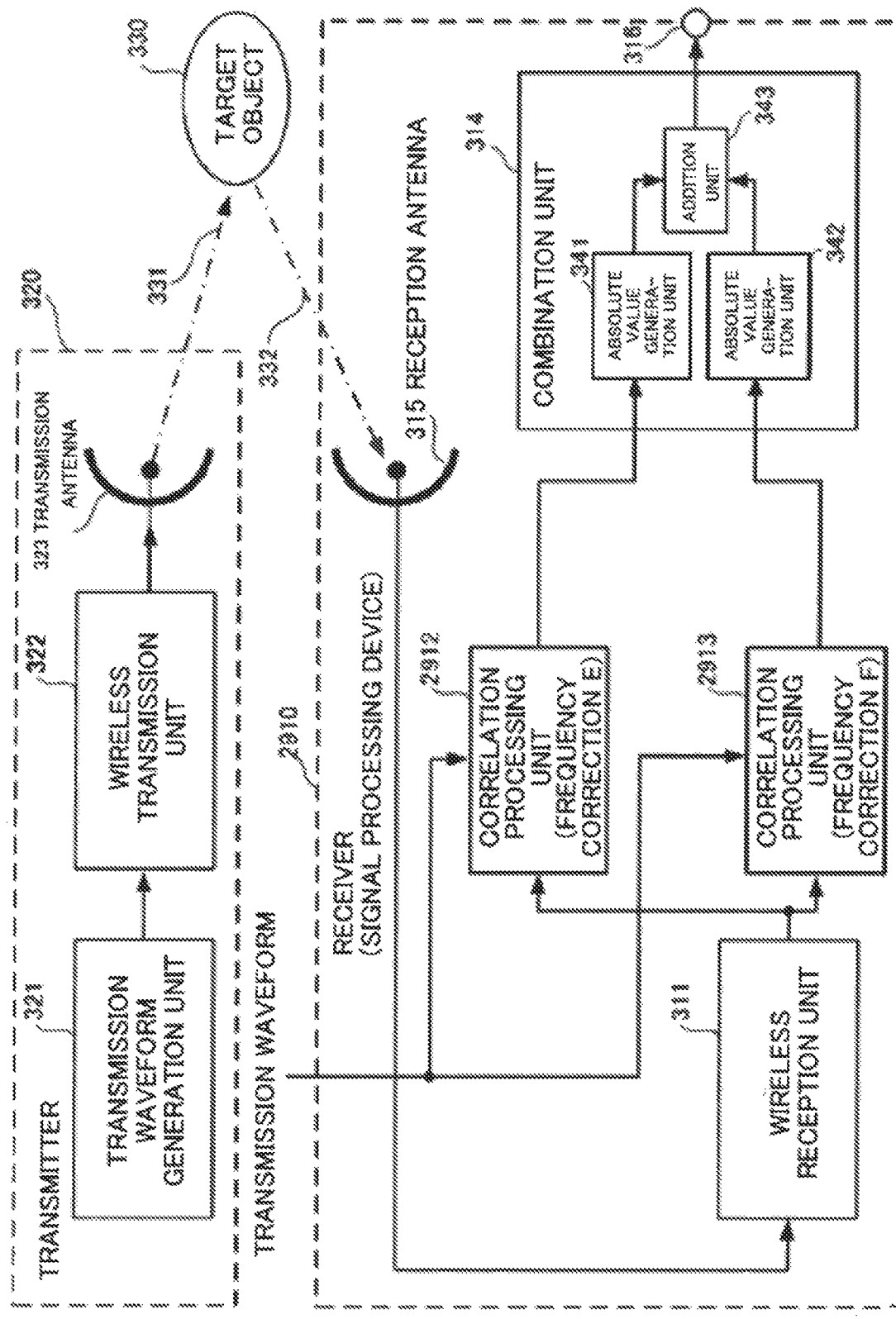
FIG. 29 is a block diagram illustrating a functional configuration of the signal processing device according to the eighth example embodiment of the present invention.

FIG. 29 is a block diagram illustrating a functional configuration of a signal processing device 2910 according to the present example embodiment. Note that a functional configuration unit in FIG. 29 similar to that in FIG. 3A is provided with same reference sign, and the repeated description thereof is omitted.

The signal processing device 2910 includes a correlation processing unit 2912 and a correlation processing unit 2913. The correlation processing unit 2912 generates a correlation waveform in the diagram (b) in FIG. 27 or 28 that avoids the island of the auto-ambiguity function 210, calculates a cross-correlation function, and outputs the cross-correlation function to a combination unit 314. The correlation processing unit 2913 generates a correlation waveform in the diagram (c) in FIG. 27 or 28 in a relationship for filling a gap between islands in a calculation range of the correlation processing unit 2912, namely, a complementary relationship while avoiding the island of the auto-ambiguity function 210, calculates a cross-correlation function, and outputs the cross-correlation function to the combination unit 314. Both avoid the island of the auto-ambiguity function 210, and thus a separating portion near zero frequency is generated.

(Correlation Waveform Generation Table)

Figure 30:
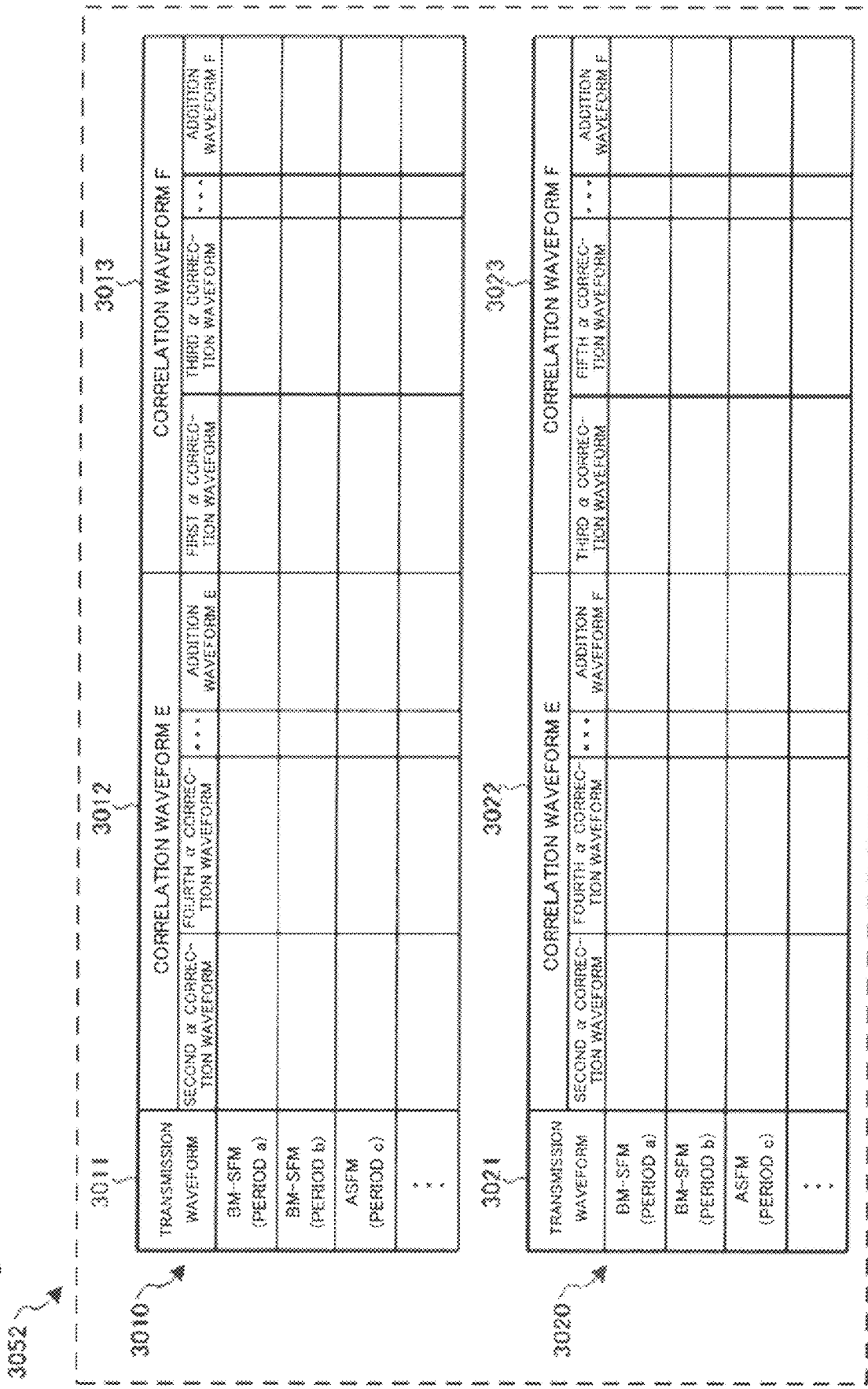
FIG. 30 is a diagram illustrating a configuration of a correlation waveform generation table according to the eighth example embodiment of the present invention.

FIG. 30 is a diagram illustrating a configuration of a correlation waveform generation table 3052 according to the present example embodiment. The correlation waveform generation table 3052 is used for generating a plurality of correction waveforms by slightly correcting a waveform based on a transmission waveform, adding the plurality of correction waveforms, and generating a correlation waveform. Note that FIG. 30 illustrates a table 3010 used for the processing illustrated in FIG. 27 and a table 3020 used for the processing illustrated in FIG. 28.

The table 3010 stores, in association with a transmission waveform 3011, data 3012 for generating a correlation waveform E in FIG. 27 and data 3013 for generating a correlation waveform F. As the data 3012, a plurality of correction waveforms and the correlation waveform E acquired by adding the plurality of waveforms are stored, the plurality of waveforms generating the correlation waveform E and including a non-correction transmission waveform. As the data 3013, a plurality of correction waveforms that generate the correlation waveform F and the correlation waveform F acquired by adding the plurality of waveforms are stored. Note that the data 3012 about the correlation waveform E are indicated by a second a correction waveform, a fourth a correction waveform, and . . . , and the data 3013 about the correlation waveform F are indicated by a first a correction waveform, a third a correction waveform, and . . . , which indicates that correction is performed in such a way as to fill each other's gap, except for zero frequency and negative frequency, in cross ambiguity functions.

The table 3020 stores, in association with a transmission waveform 3021, data 3022 for generating the correlation waveform E in FIG. 28 and data 3023 for generating the correlation waveform F. As the data 3022, a plurality of correction waveforms and the correlation waveform E acquired by adding the plurality of waveforms are stored, the plurality of waveforms generating the correlation waveform E and including a non-correction transmission waveform. As the data 3023, a plurality of correction waveforms that generate the correlation waveform F and the correlation waveform F acquired by adding the plurality of waveforms are stored. Note that the data 3022 about the correlation waveform E are indicated by a second a correction waveform, a fourth a correction waveform, and . . . , and the data 3023 about the correlation waveform F are indicated by a third a correction waveform, a fifth a correction waveform, and . . . , which indicates that correction is performed in such a way as to fill each other's gap, except for zero frequency and frequency around the zero frequency, in cross ambiguity functions.

Further, when a plurality of the transmission waveforms 3011 and 3021 are selected and used, an appropriate correction waveform and an appropriate correlation waveform that correspond to each of the transmission waveforms 3011 and 3021 are stored. Examples of the plurality of transmission waveforms 3021 and 3022 include BM-SFM waveforms varying in period of a frequency change illustrated in FIG. 6 and ASFM waveforms, which is not limited thereto.

According to the present example embodiment, an island in each cross ambiguity function is appropriately disposed by combining selections of the correction waveform generation unit of the correlation waveform generation unit in the correlation processing unit. In this way, a desired speed (including a standstill) can be excluded from a detection target and, conversely, a moving object only in a predetermined speed range can be selectively detected by generating a separating portion in a desired frequency region.

Other Example Embodiment

Note that the BM-SFM waveform and the ASFM waveform are used as a transmission waveform in the above-described example embodiments, but these waveforms are not restrictive. For example, white noise may be used. When white noise is used as a transmission waveform 1101, an ambiguity function becomes a point and cannot handle a wide range of movement speed, but detection precision of a target object becomes high. Note that, in addition, the phase modulation signal in NPL 1 may be used.

Figure 31:
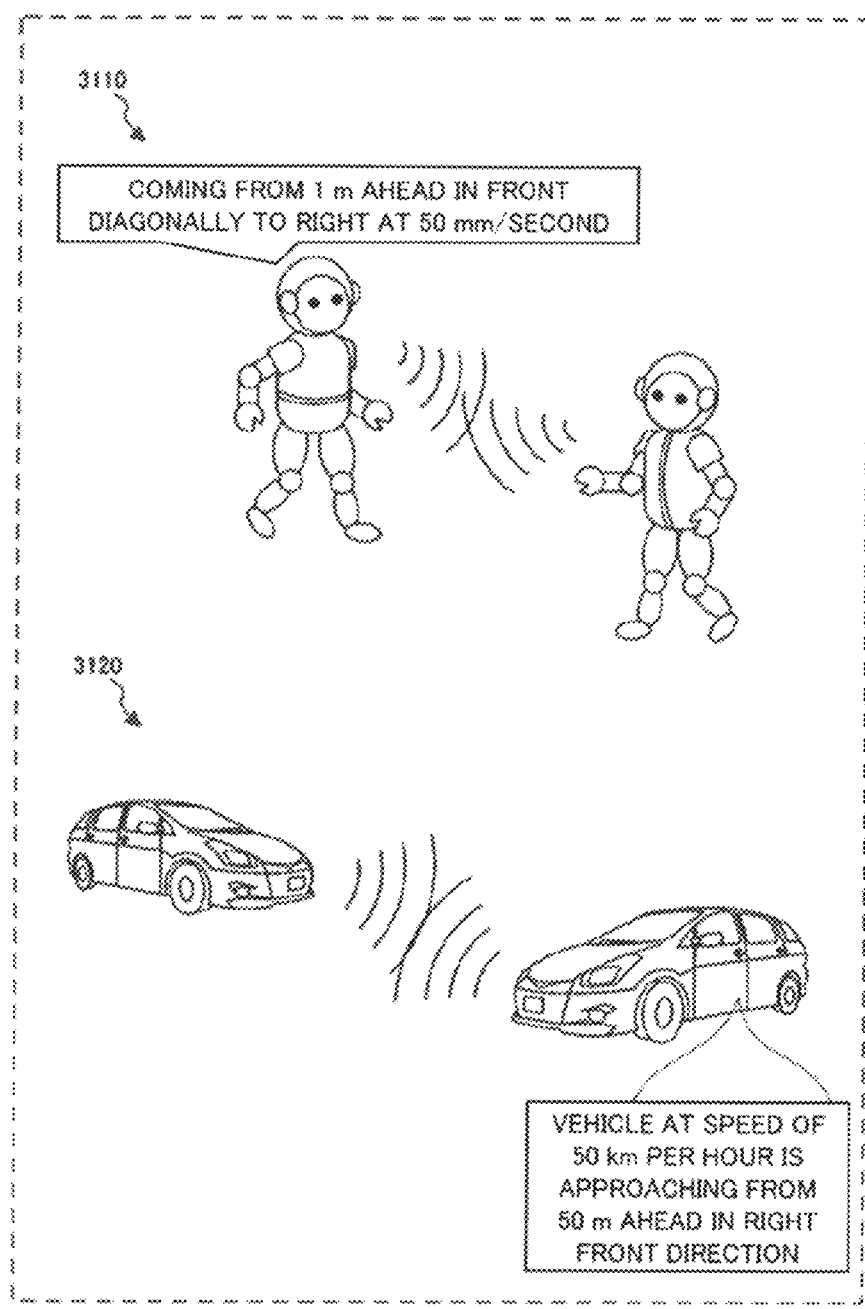
FIG. 31 is a diagram illustrating another field in which the present invention can be used.

Further, FIG. 31 is a diagram illustrating another field in which the present invention can be used. As illustrated in FIG. 31, the method of detecting a distance by a radio wave described above can be used in a technique 3110 for allowing robots to pass each other without bumping into each other and a technique 3220 for avoiding a collision of a vehicle. However, the present invention is not limited to these, and may also be used for monitoring an intruder in an office and the like, detecting movement of a person in a gymnasium, and the like. The present invention can also be used in a method of detecting a distance by a sound wave in the air or the water, instead of a radio wave. The present invention is applicable to a principle of a distance detection method using a sound wave called active sonar in monitoring in the water such as a harbor. Therefore, the effect of the present invention is similarly acquired by appropriately setting a center frequency (carrier frequency), a waveform time length, a modulated wave frequency, a frequency correction amount, and the like suitable for a sound wave. As described above, detection with fewer errors in distance measurement can also be achieved for a moving object by using the present invention in distance detection.

Although the claimed invention has been described with reference to the example embodiments, it should be understood that the claimed invention is not limited to the above-described example embodiments. Various modifications that can be understood by those skilled in the art within the scope of the claimed invention may be applied to the configuration and the details of the claimed invention. Further, a system or a device that combines different features included in the respective example embodiments in any form is also included within the scope of the present invention.

Further, the present invention may be applied to a system including a plurality of apparatuses, and may be applied to a single device. Furthermore, the present invention is also applicable to a case where a signal processing program achieving functions of the example embodiments is supplied to a system or a device directly or remotely. Therefore, in order to achieve functions of the present invention by a computer, a program installed in the computer, a medium that stores the program, or a World Wide Web (WWW) server that causes the program to be downloaded is also included within the scope of the present invention. In particular, at least, a non-transitory computer readable medium that stores a program causing a computer to execute a processing step included in the above-described example embodiments is included within the scope of the present invention.

The whole or part of the example embodiments disclosed above can be described as, but not limited to, the following supplementary notes.

[Supplementary Note 1]

A signal processing device comprising:

at least two cross-correlation calculation means each for calculating a cross-correlation function of a waveform of a reflection signal and a different correlation waveform generated from a waveform of a transmission signal, the reflection signal being acquired by reflection, from a target object, of the transmission signal that varies in frequency;

combination means for combining at least two cross-correlation functions from the at least two cross-correlation calculation means, in such a way that the cross-correlation functions are not separated in a frequency shift direction; and detection means for detecting the target object, based on a cross-correlation function being a combination result.

[Supplementary Note 2]

The signal processing device according to Supplementary Note 1, wherein the at least two cross-correlation calculation means use, as the different correlation waveform, a waveform added with a waveform acquired by performing different frequency correction on a waveform of the transmission signal, or a waveform added with a waveform acquired by performing expansion and contraction varying with time axis on a waveform of the transmission signal.

[Supplementary Note 3]

The signal processing device according to Supplementary Note 1 or 2, wherein the at least two cross-correlation calculation means use, as the different correlation waveform, a waveform in which a cross ambiguity function of a waveform of the transmission signal and a waveform on which frequency correction is performed is separated, and a cross ambiguity function, when being combined by the combination means, is also continuous.

[Supplementary Note 4]

The signal processing device according to Supplementary Note 1 or 2, wherein the at least two cross-correlation calculation means use, as the different correlation waveform, a waveform in which a cross ambiguity function of a waveform of the transmission signal and a waveform on which frequency correction is performed is separated, and a cross ambiguity function, when being combined by the combination means, is also separated in a predetermined frequency range and is continuous in another frequency range.

[Supplementary Note 5]

The signal processing device according to Supplementary Note 3 or 4, wherein the cross ambiguity function is continuous in such a way that the cross-correlation functions by the different correlation waveform overlap each other at half of a maximum value.

[Supplementary Note 6]

The signal processing device according to any one of Supplementary Notes 1 to 4, wherein the combination means adds an absolute value of each of the at least two cross-correlation functions.

[Supplementary Note 7]

The signal processing device according to any one of Supplementary Notes 1 to 4, wherein the combination means calculates a maximum value of an absolute value of each of the at least two cross-correlation functions.

[Supplementary Note 8]

The signal processing device according to Supplementary Notes 1 to 7, wherein the transmission signal includes a waveform that is a waveform having a value of an auto-ambiguity function being increased around zero delay time and zero frequency shift, and that is acquired by modulating a sinusoidal wave of frequency modulation of a sinusoidal frequency modulation (SFM) waveform.

[Supplementary Note 9]

The signal processing device according to any one of Supplementary Notes 1 to 7, wherein the transmission signal includes a waveform having a frequency being increased and decreased in a curved manner and having a frequency bandwidth being increased and decreased in a curved manner in terms of time.

[Supplementary Note 10]

The signal processing device according to Supplementary Note 9, wherein the transmission signal is a waveform having a frequency bandwidth being modulated.

[Supplementary Note 11]

The signal processing device according to Supplementary Notes 1 to 10, further comprising:

generation means for generating a modulated wave that varies in frequency as the transmission signal; and transmission means for transmitting the transmission signal to the target object.

[Supplementary Note 12]

A signal processing method comprising:

at least two cross-correlation calculation steps each of calculating a cross-correlation function of a waveform of a reflection signal and a different correlation waveform generated from a waveform of the transmission signal, the reflection signal being acquired by reflection, from a target object, of the transmission signal that varies in frequency;

a combination step of combining at least two cross-correlation functions from the at least two cross-correlation calculation means; and a detection step of detecting the target object, based on a cross-correlation function being a combination result.

[Supplementary Note 13]

A signal processing program causing a computer to execute:

at least two cross-correlation calculation steps each of calculating a cross-correlation function of a waveform of a reflection signal and a different correlation waveform generated from a waveform of the transmission signal, the reflection signal being acquired by reflection, from a target object, of a transmission signal that varies in frequency;

a combination step of combining at least two cross-correlation functions from the at least two cross-correlation calculation means; and a detection step of detecting the target object, based on a cross-correlation function being a combination result.

Other Expression of Example Embodiment

This application is based upon and claims the benefit of priority from Japanese patent application No. 2016-238243, filed on Dec. 8, 2016, and Japanese patent application No. 2017-068244, filed on Mar. 30, 2017, the disclosures of which are incorporated herein in its entirety by reference.

What is claimed is:

1. A signal processing device comprising:

at least one memory; and at least one processor coupled to the at least one memory, the at least one processor configured to perform operations to:

calculate at least two cross-correlation functions of a waveform of a reflection signal and a different correlation waveform generated from a waveform of a transmission signal, the reflection signal being acquired by reflection, from a target object, of the transmission signal that varies in frequency;

combine the at least two cross-correlation functions in such a way that the cross-correlation functions are not separated in a frequency shift direction; and detect the target object, based on a cross-correlation function being a combination result.

2. The signal processing device according to claim 1, wherein the at least one processor is configured to perform the operations to:

use, as the different correlation waveform, a waveform added with a waveform acquired by performing different frequency correction on a waveform of the transmission signal, or a waveform added with a waveform acquired by performing expansion and contraction varying with time axis on a waveform of the transmission signal to calculate the cross-correlation functions.

3. The signal processing device according to claim 1, wherein the at least one processor is configured to perform the operations to:

use, as the different correlation waveform, a waveform in which a cross ambiguity function of a waveform of the transmission signal and a waveform on which frequency correction is performed is separated, and a cross ambiguity function, when being combined is also continuous.

4. The signal processing device according to claim 1, wherein the at least one processor is configured to perform the operations to:

use, as the different correlation waveform, a waveform in which a cross ambiguity function of a waveform of the transmission signal and a waveform on which frequency correction is performed is separated, and a cross ambiguity function, when being combined is also separated in a predetermined frequency range and is continuous in another frequency range.

5. The signal processing device according to claim 3, wherein the at least one processor is configured to perform the operations to:

the cross ambiguity function is continuous in such a way that the cross-correlation functions by the different correlation waveform overlap each other at half of a maximum value.

6. The signal processing device according to claim 1, wherein the at least one processor is configured to perform the operations to:

add an absolute value of each of the at least two cross-correlation functions.

7. The signal processing device according to claim 1, wherein the at least one processor is configured to perform the operations to:

calculate a maximum value of an absolute value of each of the at least two cross-correlation functions.

8. The signal processing device according to claim 1, wherein
the transmission signal includes a waveform that is a waveform having a value of an auto-ambiguity function being increased around zero delay time and zero frequency shift, and that is acquired by modulating a sinusoidal wave of frequency modulation of a sinusoidal frequency modulation (SFM) waveform.

9. The signal processing device according to claim 1, wherein
the transmission signal includes a waveform having a frequency being increased and decreased in a curved manner and having a frequency bandwidth being increased and decreased in a curved manner in terms of time.

10. The signal processing device according to claim 9, wherein
the transmission signal is a waveform having a frequency bandwidth being modulated.

11. The signal processing device according to claim 1, wherein the at least one processor is configured to perform the operations to:
generate a modulated wave that varies in frequency as the transmission signal; and
transmit the transmission signal to the target object.

12. A signal processing method comprising:
calculating at least two cross-correlation functions of a waveform of a reflection signal and a different correlation waveform generated from a waveform of the transmission signal, the reflection signal being acquired by reflection, from a target object, of the transmission signal that varies in frequency;
combining the at least two cross-correlation functions in such a way that the cross-correlation functions are not separated in a frequency shift direction; and
detecting the target object, based on a cross-correlation function being a combination result.

13. A non-transitory storing medium that stores a signal processing program causing a computer to execute:
calculating at least two cross-correlation functions of a waveform of a reflection signal and a different correlation waveform generated from a waveform of the transmission signal, the reflection signal being acquired by reflection, from a target object, of a transmission signal that varies in frequency;
combining the at least two cross-correlation functions in such a way that the cross-correlation functions are not separated in a frequency shift direction; and
detecting the target object, based on a cross-correlation function being a combination result.

* * * * *